United States Patent
Senda et al.

(10) Patent No.: US 11,655,362 B2
(45) Date of Patent: May 23, 2023

(54) BLOCK COPOLYMER OR HYDROGENATED PRODUCT OF SAME

(71) Applicant: KURARAY CO., LTD., Kurashiki (JP)

(72) Inventors: Yasushi Senda, Kamisu (JP); Masahiro Kato, Kamisu (JP)

(73) Assignee: KURARAY CO., LTD., Kurashiki (JP)

(*) Notice: Subject to any disclaimer, the term of this patent is extended or adjusted under 35 U.S.C. 154(b) by 459 days.

(21) Appl. No.: 16/763,845

(22) PCT Filed: Nov. 21, 2018

(86) PCT No.: PCT/JP2018/043022
§ 371 (c)(1),
(2) Date: May 13, 2020

(87) PCT Pub. No.: WO2019/103048
PCT Pub. Date: May 31, 2019

(65) Prior Publication Data
US 2020/0283617 A1    Sep. 10, 2020

(30) Foreign Application Priority Data

Nov. 22, 2017   (JP) .............................. JP2017-225097
May 31, 2018    (JP) .............................. JP2018-105641

(51) Int. Cl.
| | | |
|---|---|---|
| C08L 53/02 | (2006.01) |
| C09J 7/38 | (2018.01) |
| C08F 112/08 | (2006.01) |
| C08F 136/06 | (2006.01) |
| C08F 136/08 | (2006.01) |
| C08F 136/04 | (2006.01) |
| C08F 8/04 | (2006.01) |

(52) U.S. Cl.
CPC .............. C08L 53/025 (2013.01); C08F 8/04 (2013.01); C08F 112/08 (2013.01); C08F 136/045 (2013.01); C08F 136/06 (2013.01); C08F 136/08 (2013.01); C09J 7/387 (2018.01); *C08L 2203/16* (2013.01)

(58) Field of Classification Search
CPC ....... C08L 53/025; C09J 7/387; C08F 112/08; C08F 136/06; C08F 136/045; C08F 8/04; C08F 136/08
See application file for complete search history.

(56) References Cited

U.S. PATENT DOCUMENTS

| | | |
|---|---|---|
| 3,966,691 A | 6/1976 | Halasa |
| 4,943,616 A * | 7/1990 | Mishra .................... C08F 10/10 526/146 |
| 2001/0005131 A1 | 12/2001 | Tomita |
| 2003/0158336 A1 | 8/2003 | Yaguchi et al. |
| 2014/0213728 A1 | 7/2014 | Kosaka et al. |
| 2017/0198131 A1 | 7/2017 | Jogo et al. |

FOREIGN PATENT DOCUMENTS

| | | | |
|---|---|---|---|
| EP | 1 277 822 A1 | 1/2003 | |
| EP | 1277822 A1 * | 1/2003 | .............. C08L 23/04 |
| JP | 2-73806 A | 3/1990 | |
| JP | 5-202287 A | 8/1993 | |
| JP | 10-67894 A | 3/1998 | |
| JP | 2002-284830 A | 10/2002 | |
| JP | 2003-5440 A | 1/2003 | |
| JP | 2005-513172 A | 5/2005 | |
| JP | 2006-117879 A | 5/2006 | |
| JP | 2007-79348 A | 3/2007 | |
| JP | 2010-053319 A | 3/2010 | |
| JP | 2011-148956 A | 8/2011 | |
| TW | 103827157 A | 5/2014 | |
| TW | 201605963 A | 2/2016 | |
| WO | WO 2000/015680 A1 | 3/2000 | |

OTHER PUBLICATIONS

Japanese Office Action dated Sep. 10, 2019 in Patent Application No. 20153-536107, 3 pages.
Extended European Search Report dated Jul. 16, 2021 in European Patent Application No. 18880805.9, 7 pages
Combined Taiwanese Office Action and Search Report dated Feb. 18, 2022 in corresponding Taiwanese Patent Application No. 107141618 (with English Translation of Category of Cited Documents), 5 pages
International Search Report dated Feb. 12, 2019 in PCT/JP2018/043022 filed on Nov. 21, 2018, 1 page.

* cited by examiner

*Primary Examiner* — Robert D Harlan
(74) *Attorney, Agent, or Firm* — Oblon, McClelland, Maier & Neustadt, L.L.P.

(57) ABSTRACT

A block copolymer or a hydrogenate thereof, containing a polymer block (A) and a polymer block (B), in which the polymer block (B) has a structural unit derived from a conjugated diene compound, the structural unit including one or more kinds of alicyclic skeletons (X) represented by a formula (X) in the main chain.

18 Claims, No Drawings

BLOCK COPOLYMER OR HYDROGENATED PRODUCT OF SAME

TECHNICAL FIELD

The present invention relates to a block copolymer or a hydrogenate thereof. Specifically, the present invention relates to the block copolymer or a hydrogenate thereof, a resin composition containing the block copolymer or a hydrogenate thereof, and various applications of the block copolymer, the hydrogenate, or the resin composition.

BACKGROUND ART

Some of block copolymers having a polymer block containing a structural unit derived from an aromatic vinyl compound and a polymer block containing a structural unit derived from a conjugated diene compound, and hydrogenates thereof are already known to have vibration damping properties, and have thus been used for vibration damping materials. Further, some of the block copolymers and hydrogenates thereof may have physical properties such as acoustic insulating properties, heat resistance, impact resistance, and pressure-sensitive adhesiveness or bonding adhesiveness, in addition to the vibration damping properties, and are thus considered to be usable in various applications. Therefore, technical improvements for improving physical properties required according to various applications have been made on the block copolymers and hydrogenates thereof.

For example, a hydrogenated block copolymer of a styrene-based compound with a conjugated diene compound such as isoprene and butadiene, in which a peak temperature of tan δ and a vinyl bond amount are specified in order to improve mechanical properties such as vibration damping properties, flexibility, heat resistance, tensile strength, and impact resistance, is disclosed (see, for example, PTLs 1 to 4).

In addition, as a resin composition having excellent vibration damping properties, flexibility, transparency, heat resistance, and the like, a resin composition containing a thermoplastic resin and a block copolymer in which a vinyl bond amount is specified is disclosed (for example, PTLs 5 and 6).

CITATION LIST

Patent Literature

PTL 1: JP 2002-284830 A
PTL 2: WO2000/015680
PTL 3: JP 2006-117879 A
PTL 4: JP 2010-053319 A
PTL 5: JP 05-202287 A
PTL 6: JP 10-067894 A
PTL 7: JP 2005-513172 T
PTL 8: U.S. Pat. No. 3,966,691

SUMMARY OF INVENTION

Technical Problem

As described above, techniques of specifying a vinyl bond amount or tan δ of a conjugated diene compound; using a conjugated diene compound such as isoprene and butadiene and a styrene compound; and the like in order to improve vibration damping properties or various physical properties are disclosed. However, in a case where butadiene was used as the conjugated diene compound, there was a limit in increasing a glass transition temperature even though the vinyl bond amount was large, whereas in a case where isoprene was used, the glass transition temperature could be increased by increasing the vinyl bond amount, but it was difficult to increase a hydrogenation rate, and it was also difficult to further improve the vibration damping properties and various physical properties in a well-balanced manner. Further, in a case where isoprene and butadiene were used in combination, a hydrogenation rate could be increased to some extent, but the glass transition temperature could not be improved and the vibration damping properties were insufficient, as compared with a case where isoprene was used alone. In addition, the glass transition temperature could be elevated by using a styrene-based copolymer of a styrene-based compound and a conjugated diene compound, but a peak intensity of tan δ is lowered, as compared with that of the styrene-non-copolymer, and thus, there was room for improvement in order to express more excellent vibration damping properties.

On the other hand, an elastomer having a cyclic vinyl unit is known as a polymer using a conjugated diene compound such as isoprene and butadiene (see, for example, PTLs 7 and 8). However, PTLs 7 and 8 disclose a method of producing the elastomer, and the like, but do not disclose any of applications thereof and effects in a case where the elastomer is used for a block copolymer and is used to form a copolymer.

Therefore, an object of the present invention is to provide a block copolymer or a hydrogenate thereof, which has excellent vibration damping properties and is suitable in various applications.

Solution to Problem

As a result of extensive studies to solve the problems, the present inventors have found that the problems can be solved with a block copolymer or a hydrogenate thereof, containing a polymer block having a specific alicyclic skeleton in the main chain, thereby leading to the present invention.

That is, the present invention is as follows.

[1] A block copolymer or a hydrogenate thereof, containing a polymer block (A) and a polymer block (B), in which the polymer block (B) has a structural unit derived from a conjugated diene compound, the structural unit including one or more kinds of alicyclic skeletons (X) represented by the following formula (X) in the main chain:

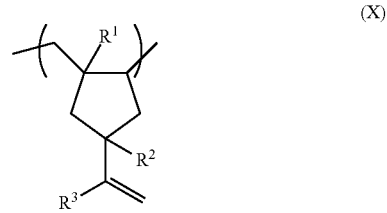

wherein $R^1$ to $R^3$ each independently represent a hydrogen atom or a hydrocarbon group having 1 to 11 carbon atoms, and a plurality of each of $R^1$ to $R^3$ may be the same as or different from each other.

[2] A resin composition containing the block copolymer or the hydrogenate thereof.

[3] A vibration damping material, a film, a sheet, a bonding adhesive, a pressure-sensitive adhesive, or a laminate formed using the block copolymer, the hydrogenate, or the resin composition.

Advantageous Effects of Invention

According to the present invention, it is possible to provide a block copolymer or a hydrogenate thereof, which has excellent vibration damping properties and is suitable in various applications.

DESCRIPTION OF EMBODIMENTS

The present invention relates to a block copolymer or a hydrogenate thereof, containing a polymer block (A) and a polymer block (B), in which the polymer block (B) has a structural unit derived from a conjugated diene compound, the structural unit including one or more kinds of alicyclic skeletons (X) represented by the formula (X) in the main chain; a resin composition containing the block copolymer or a hydrogenate thereof; and various applications of the block copolymer, the hydrogenate, or the resin composition.

Hereinafter, the present invention will be described.
<Block Copolymer or Hydrogenate Thereof>
[Polymer Block (A)]

From the viewpoint of vibration damping properties and mechanical properties, it is preferable that the polymer block (A) constituting the block copolymer of the present invention has a structural unit derived from an aromatic vinyl compound used as a monomer.

The polymer block (A) preferably contains a structural unit derived from an aromatic vinyl compound (hereinafter sometimes abbreviated as an "aromatic vinyl compound unit") in an amount of more than 70% by mole in the polymer block (A), and from the viewpoint of mechanical properties, the amount is more preferably 80% by mole or more, even more preferably 90% by mole or more, even still more preferably 95% by mole or more, and particularly preferably substantially 100% by mole.

Examples of the aromatic vinyl compound include styrene, o-methylstyrene, m-methylstyrene, p-methylstyrene, α-methylstyrene, 6-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a silyl group-substituted styrene derivative, indene, vinylnaphthalene, and N-vinylcarbazole. These aromatic vinyl compounds may be used alone or in combination of two or more kinds thereof. Among those, from the viewpoint of a balance between production cost and physical properties, styrene, α-methylstyrene, p-methylstyrene, and a mixture thereof are preferred, and styrene is more preferred.

Within a range in which the object and the advantageous effects of the present invention are not impaired, the polymer block (A) may contain a structural unit derived from another unsaturated monomer other than the aromatic vinyl compound (hereinafter sometimes simply referred to as "another unsaturated monomer unit") at a ratio of 30% by mole or less in the polymer block (A), but the ratio is preferably less than 20% by mole, more preferably less than 15% by mole, even more preferably less than 10% by mole, even still more preferably less than 5% by mole, and particularly preferably 0% by mole.

Examples of such another unsaturated monomer include at least one selected from the group consisting of butadiene, isoprene, 2,3-dimethylbutadiene, 1,3-pentadiene, 1,3-hexadiene, isobutylene, methyl methacrylate, methyl vinyl ether, β-pinene, 8,9-p-menthene, dipentene, methylene norbornene, and 2-methylene tetrahydrofuran. The bonding mode in a case where the polymer block (A) contains the other unsaturated monomer unit is not particularly limited, and may be any of a random form and a tapered form.

The block copolymer may have at least one of the polymer blocks (A). In a case where the block copolymer has two or more polymer blocks (A), these polymer blocks (A) may be the same as or different from each other. In addition, in the present specification, "the polymer blocks differ" means that the polymer blocks differ in at least one of the monomer units constituting the polymer blocks, the weight-average molecular weight, the stereoregularity, and the ratio of each monomer unit and the copolymerization conformation (random, gradient, or block) in a case where the polymer block has a plurality of monomer units.
(Weight-Average Molecular Weight)

The weight-average molecular weight (Mw) of the polymer block (A) is not particularly limited, but the weight-average molecular weight of at least one polymer block (A) among the polymer blocks (A) contained the block copolymer is preferably 3,000 to 60,000, and more preferably 4,000 to 50,000. When the block copolymer has at least one polymer block (A) having a weight-average molecular weight falling within the range, the mechanical strength is further improved and the molding workability is also excellent.

In addition, the weight-average molecular weight is a weight-average molecular weight in terms of standard polystyrene, as determined by gel permeation chromatography (GPC) measurement.
(Content of Polymer Block (A))

A content of the polymer block (A) in the block copolymer is preferably 50% by mass or less, more preferably 30% by mass or less, even more preferably 16% by mass or less, and particularly preferably 14% by mass or less. When the content is 50% by mass or less, a block copolymer or a hydrogenate thereof, which has appropriate flexibility and excellent vibration damping properties without a decrease in the tan δ peak top intensity, can be obtained. Further, the lower limit is preferably 1% by mass or more, more preferably 3% by mass or more, and even more preferably 6% by mass or more. When the content is 1% by mass or more, a block copolymer or a hydrogenate thereof, which has mechanical properties and molding workability suitable in various applications, can be obtained.

In addition, the content of the polymer block (A) in the block copolymer is a value determined by $^1$H-NMR measurement, and more specifically, a value measured according to the method described in Examples.

[Polymer Block (B)]

The polymer block (B) constituting the block copolymer of the present invention has a structural unit derived from a conjugated diene compound, the structural unit including one or more kinds of alicyclic skeletons (X) represented by the following formula (X) in the main chain (hereinafter sometimes simply referred to as an "alicyclic skeleton-containing unit"). Further, the polymer block (B) can contain a structural unit derived from a conjugated diene compound, the structural unit containing no alicyclic skeleton (X) (hereinafter sometimes simply referred to as a "conjugated diene unit").

From the viewpoint of expressing excellent vibration damping properties, a total of the alicyclic skeleton-containing unit and the conjugated diene unit in the polymer block (B) is preferably 50% by mole or more, more preferably 70% by mole or more, even more preferably 90% by mole or more, and particularly preferably substantially 100% by mole.

In a case where the block copolymer has two or more polymer blocks (B), the polymer blocks (B) may be the same as or different from each other.

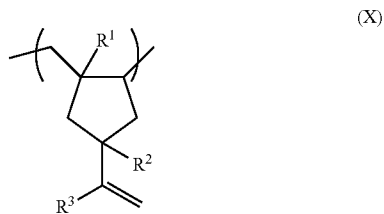

(X)

In the formula (X), $R^1$ to $R^3$ each independently represent a hydrogen atom or a hydrocarbon group having 1 to 11 carbon atoms, and a plurality of each of $R^1$ to $R^3$ may be the same as or different from each other. The hydrocarbon group preferably has 1 to 5 carbon atoms, more preferably has 1 to 3 carbon atoms, and even more preferably has one carbon atom (that is, a methyl group). Further, the hydrocarbon group may be linear or branched, or may be a saturated or unsaturated hydrocarbon group. From the viewpoints of physical properties and formation of the alicyclic skeleton (X), it is particularly preferable that $R^1$ to $R^3$ are each independently the hydrogen atom or the methyl group.

In addition, in a case where the block copolymer is hydrogenated, the vinyl group in the formula (X) can be hydrogenated. Therefore, the meaning of the alicyclic skeleton (X) in a hydrogenate also encompasses a skeleton in which the vinyl group in the formula (X) is hydrogenated.

The polymer block (B) has a structural unit derived from a conjugated diene compound, and the alicyclic skeleton (X) is derived from the conjugated diene compound. The alicyclic skeleton (X) is generated by anionic polymerization of the conjugated diene compound by a method which will be described later, but at least one kind of the alicyclic skeleton (X) is included in the main chain of the alicyclic skeleton-containing unit according to the conjugated diene compound used. When the alicyclic skeleton (X) is incorporated into the main chain of the structural unit included in the polymer block (B), the molecular motion is reduced, and therefore, the glass transition temperature is increased, the peak top intensity of tan δ at around room temperature is improved, and excellent vibration damping properties can be expressed.

Examples of the conjugated diene compound include butadiene, isoprene, hexadiene, 2,3-dimethyl-1,3-butadiene, 1,3-pentadiene, and myrcene. Among those, butadiene, isoprene, or a combination of butadiene and isoprene are preferred.

In a case where butadiene and isoprene are used in combination, a blending ratio of [isoprene/butadiene] (mass ratio) is not particularly limited, but is preferably 5/95 to 95/5, more preferably 10/90 to 90/10, even more preferably 40/60 to 70/30, and particularly preferably 45/55 to 65/35. In addition, when the mixing ratio [isoprene/butadiene] is indicated by a molar ratio, it is preferably 5/95 to 95/5, more preferably 10/90 to 90/10, even more preferably 40/60 to 70/30, and particularly preferably 45/55 to 55/45.

By way of a specific example, the alicyclic skeleton (X) which is mainly generated in a case where butadiene, isoprene, or a combination of butadiene and isoprene is used as the conjugated diene compound will be described.

In a case where butadiene is used alone as the conjugated diene compound, the alicyclic skeleton (X) having a combination of the following substituents (i) is generated. That is, in this case, the alicyclic skeleton (X) is only an alicyclic skeleton in which $R^1$ to $R^3$ are simultaneously hydrogen atoms. Accordingly, the present invention can provide a block copolymer or a hydrogenate thereof, in which the polymer block (B) has a structural unit including one kind of the alicyclic skeleton (X) in which $R^1$ to $R^3$ are simultaneously hydrogen atoms in the main chain.

Moreover, in a case where isoprene is used alone as the conjugated diene compound, two kinds of the alicyclic skeletons (X) having a combination of the following substituents (v) and (vi) are mainly generated.

In addition, in a case where butadiene and isoprene are used in combination as the conjugated diene compound, six kinds of the alicyclic skeletons (X) having a combination of the following substituents (i) to (vi) are mainly generated.

(i): $R^1$=hydrogen atom, $R^2$=hydrogen atom, $R^3$=hydrogen atom (ii): $R^1$=hydrogen atom, $R^2$=methyl group, $R^3$=hydrogen atom (iii): $R^1$=hydrogen atom, $R^2$=hydrogen atom, $R^3$=methyl group (iv): $R^1$=methyl group, $R^2$=hydrogen atom, $R^3$=hydrogen atom (v): $R^1$=methyl group, $R^2$=methyl group, $R^3$=hydrogen atom (vi): $R^1$=methyl group, $R^2$=hydrogen atom, $R^3$=methyl group In the formula (X), from the viewpoint that the molecular motion is further reduced and the vibration damping properties are further improved by incorporation of a substituent which is a hydrocarbon group, it is preferable that at least one kind of the alicyclic skeleton (X) in the polymer block (B) is an alicyclic skeleton (X') in which at least one of $R^1$ to $R^3$ is a hydrocarbon group having 1 to 11 carbon atoms. Among those, from the viewpoint of a balance between vibration damping properties and mechanical properties since the alicyclic skeleton can be efficiently generated from the conjugated diene compound, it is more preferable that the hydrocarbon group in the alicyclic skeleton (X') is a methyl group.

In particular, the alicyclic skeleton in which $R^1$ to $R^3$ each independently represent a hydrogen atom or a methyl group, and $R^1$ to $R^3$ are not simultaneously hydrogen atoms is more preferred. That is, it is more preferable that the polymer block (B) has a constituent unit including any one or more kinds of the alicyclic skeletons having the combination of the substituents (ii) to (vi) in the main chain.

(Vinyl Bond Amount of Polymer Block (B))

In a case where the constituent unit constituting the polymer block (B) is any of an isoprene unit, a butadiene unit, and a mixture unit of isoprene and butadiene, a bonding mode of isoprene and butadiene other than the bonding mode forming the alicyclic skeleton (X) can take can take a 1,2-bond or a 1,4-bond in the case of butadiene, and can take a 1,2-bond, a 3,4-bond, or a 1,4-bond in the case of isoprene.

In the block copolymer and a hydrogenate thereof, a content of the 3,4-bond unit and the 1,2-bond unit in the polymer block (B) (hereinafter sometimes simply referred to as a "vinyl bond amount") is preferably 55 to 95% by mole, more preferably 63 to 95% by mole, and even more preferably 70 to 95% by mole. Within the range, excellent vibration damping properties can be expressed.

Here, the vinyl bond amount is a value calculated by $^1$H-NMR measurement according to the method described in Examples.

In addition, in a case where the polymer block (B) is formed of butadiene alone, the "content of the 3,4-bond unit and the 1,2-bond unit" is read as "the content of the 1,2-bond unit" and applied.

(Content of Alicyclic Skeleton (X))

The polymer block (B) may include a structural unit including the alicyclic skeleton (X) in the main chain, but from the viewpoint of obtaining an effect of more excellent vibration damping properties, the polymer block (B) preferably contains the alicyclic skeleton (X) in the amount of 1% by mole or more, more preferably 1.1% by mole or more, even more preferably 1.4% by mole or more, even still more preferably 1.8% by mole or more, further more preferably 4% by mole or more, even further more preferably 10% by mole or more, and particularly preferably 13% by mole or more. Further, the upper limit of the content of the alicyclic skeleton (X) in the polymer block (B) is not particularly limited within a range in which the advantageous effects of the present invention are not impaired, but from the viewpoint of productivity, the upper limit is preferably 40% by mole or less, and may be 30% by mole or less, may be 20% by mole or less, or may be 18% by mole or less.

From the viewpoint of further improving the vibration damping properties, the polymer block (B) more preferably contains the alicyclic skeleton (X') in the amount of 1% by mole or more, and the amount is even more preferably 1.3% by mole or more, and even still more preferably 1.6% by mole or more. The upper limit of the content of the alicyclic skeleton (X') is the same as the upper limit of the content of the alicyclic skeleton (X).

More specifically, the content of the alicyclic skeleton in each case of using isoprene, butadiene, or a combination of butadiene and isoprene as the conjugated diene compound is as follows.

In a case where isoprene is used as the conjugated diene compound, when one or more kinds of the alicyclic skeletons (X') having a combination of the substituents (v) and (vi) are present in the polymer block (B), a total content of the alicyclic skeletons (X') is preferably 1% by mole or more, and more preferably 1.5% by mole or more, from the viewpoint of obtaining the effect of more excellent vibration damping properties; and the total content is even more preferably 2% by mole or more, even still more preferably 3% by mole or more, and particularly preferably 4% by mole or more, from the viewpoint of obtaining an effect of excellent vibration damping properties in a broad temperature range. In addition, the upper limit of the total content in a case where isoprene is used is the same as the upper limit of the content of the alicyclic skeleton (X).

In a case where butadiene is used as the conjugated diene compound, when the alicyclic skeleton (X) is present in the polymer block (B), the content of the alicyclic skeleton (X) is preferably 5% by mole or more, more preferably 10% by mole or more, even more preferably 15% by mole or more, even still more preferably 20% by mole or more, further more preferably 25% by mole or more, and particularly preferably 30% by mole or more, from the viewpoint of obtaining the effect of more excellent vibration damping properties. In addition, the upper limit of the content in a case where butadiene is used is the same as the upper limit of the content of the alicyclic skeleton (X).

In a case where butadiene and isoprene are used in combination as the conjugated diene compound, when one or more kinds of the alicyclic skeletons (X') having a combination of the substituents (ii), (iii), (v), and (vi) are present in the polymer block (B), a total content of the alicyclic skeletons (X') is preferably 1% by mole or more, more preferably 2% by mole or more, even more preferably 5% by mole or more, even still more preferably 8% by mole or more, and further more preferably 13% by mole or more, from the viewpoint of obtaining the effect of more excellent vibration damping properties. The upper limit of the total content in a case where butadiene and isoprene are used in combination is the same as the upper limit of the content of the alicyclic skeleton (X).

Furthermore, in a case where butadiene and isoprene are used in combination as the conjugated diene compound, when one or more kinds of the alicyclic skeletons (X) having a combination of the substituents (i) to (vi) are present in the polymer block (B), a total content of the alicyclic skeletons (X) is preferably 1% by mole or more, and more preferably 5% by mole or more, from the viewpoint of obtaining the effect of more excellent vibration damping properties. The upper limit of the total content in a case where butadiene and isoprene are used in combination is the same as the upper limit of the content of the alicyclic skeleton (X).

Moreover, the content of the alicyclic skeleton (X) (including (X')) included in the block copolymer or a hydrogenate thereof is a value determined from an integrated value derived from the alicyclic skeleton (X) in the polymer block (B) by $^{13}$C-NMR measurement of the block copolymer, and more specifically, a value measured according to the method described in Examples.

Furthermore, in a case where a hydrogenation rate of the polymer block (B) is 0% by mole or more and less than 50% by mole in the block copolymer or the hydrogenate thereof of the present invention, it is possible to specify a content molar ratio of the vinyl group bonded to the alicyclic skeleton (X) to the vinyl group bonded to the main chain.

For example, in the alicyclic skeleton (X') having a combination of the substituents (ii), (iii), (v), and (vi), a chemical shift in $^{13}$C-NMR of the carbon atom ((a) in the following chemical formula) at a terminal of the vinyl group bonded to the alicyclic skeleton (X') appears in the vicinity of 107 to 110 ppm, and a chemical shift in $^{13}$C-NMR of the carbon atom ((b) in the following chemical formula) at a terminal of the vinyl group bonded to the main chain appears in the vicinity of 110 to 116 ppm. Further, in a case where the hydrogenation rate is 0 to 40% by mole, a peak area ratio [the peak area at a chemical shift value of 107 to 110 ppm]/[the peak area at a chemical shift value of 110 to 116 ppm] as measured by $^{13}$C-NMR is usually in the range of 0.01 to 3.00, and from the viewpoint that more excellent vibration damping properties can be expressed, the area ratio is preferably 0.01 to 1.50, more preferably 0.01 to 1.00, even more preferably 0.01 to 0.50, and even still more preferably 0.01 to 0.20.

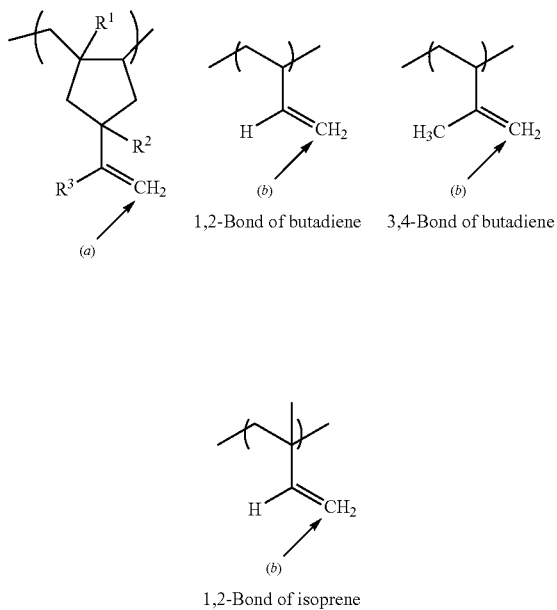

1,2-Bond of butadiene   3,4-Bond of butadiene 1,2-Bond of isoprene

Moreover, with regard to the hydrogenate of the present invention, in the $^{13}$C-NMR measurement, a peak derived from a carbon atom on the alicyclic skeleton (X) is hardly observed, but a peak derived from the carbon atom on the alicyclic skeleton (X) in which the substituent $R^3$ is a hydrocarbon group having 1 to 11 carbon atoms, with the alicyclic skeleton (X) being bonded to a branched alkyl group derived from the vinyl group having $R^3$, can be observed.

Thus, in the hydrogenate of the present invention, in a case where the hydrogenation rate of the polymer block (B) is 50 to 99% by mole, it is possible to specify a content molar ratio of the carbon atom on the alicyclic skeleton (X) bonded to the branched alkyl group derived from the vinyl group having $R^3$ to the carbon atom on the main chain bonded to the branched alkyl group derived from the vinyl group.

For example, in the alicyclic skeleton (X) having a combination of the substituents (iii) and (vi), a chemical shift in $^{13}$C-NMR of the carbon atom ((c) in the following chemical formula) on the alicyclic skeleton (X) bonded to the isoprene group appears in the vicinity of 50.0 to 52.0 ppm, and a chemical shift in $^{13}$C-NMR of the carbon atom ((d) in the following chemical formula) on the main chain bonded to the isoprene group appears in the vicinity of 43.0 to 45.0 ppm. Further, in a case where the hydrogenation rate is 40 to 99% by mole, a peak area ratio [the peak area at a chemical shift value of 50.0 to 52.0 ppm]/[the peak area at a chemical shift value of 43.0 to 45.0 ppm] as measured by $^{13}$C-NMR is usually in the range of 0.01 to 3.00, and from the viewpoint that more excellent vibration damping properties can be expressed, the area ratio is preferably 0.01 to 1.50, more preferably 0.01 to 1.00, even more preferably 0.01 to 0.50, and even still more preferably 0.01 to 0.25.

In addition, more specifically, the peak area ratio can be measured according to the method described in Examples.

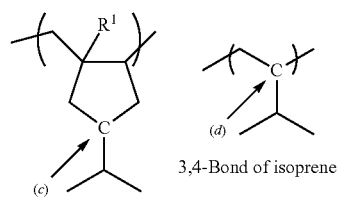

3,4-Bond of isoprene (Weight-Average Molecular Weight)

From the viewpoint of vibration damping properties, and molding workability and the like in the case of forming a film or a laminate, the weight-average molecular weight of all the polymer blocks (B) contained in the block copolymer is preferably 15,000 to 800,000, more preferably 50,000 to 700,000, even more preferably 70,000 to 600,000, particularly preferably 90,000 to 500,000, and most preferably 130,000 to 450,000, in the state before hydrogenation.

(Other Structural Units)

The polymer block (B) may contain a structural unit derived from another polymerizable monomer other than the conjugated diene compound as long as the object and the advantageous effects of the present invention are not impaired. In this case, the content of the structural unit derived from such another polymerizable monomer other than the conjugated diene compound in the polymer block (B) is preferably less than 50% by mole, more preferably less than 30% by mole, even more preferably less than 20% by mole, even still more preferably less than 10% by mole, and particularly preferably 0% by mole.

Preferred examples of such another polymerizable monomers include at least one compound selected from the group consisting of aromatic vinyl compounds such as styrene, α-methylstyrene, o-methylstyrene, m-methylstyrene, p-methylstyrene, p-t-butylstyrene, 2,4-dimethylstyrene, N-vinylcarbazole, vinyl naphthalene and vinyl anthracene, as well as methyl methacrylate, methyl vinyl ether, β-pinene, 8,9-p-menthene, dipentene, methylene norbornene, 2-methylene tetrahydrofuran, 1,3-cyclopentadiene, 1,3-cyclohexadiene, 1,3-cycloheptadiene, and 1,3-cyclooctadiene.

The block copolymer may have at least one of the polymer blocks (B). In a case where the block copolymer has two or more polymer blocks (B), the polymer blocks (B) may be the same as or different from each other.

[Production Method]

(Block Copolymer)

As for the method of producing a block copolymer of the present invention, a block copolymer can be obtained by, for example, by polymerizing one or more conjugated diene compounds as a monomer by an anionic polymerization method to form a polymer block (B) having a structural unit including the alicyclic skeleton (X) in the main chain, adding a monomer of a polymer block (A), and if necessary, further adding the monomer of the polymer block (A) and the conjugated diene compound sequentially.

As a method of generating an alicyclic skeleton by the anionic polymerization method, a known technique can be used (see, for example, the specification of U.S. Pat. No. 3,966,691). The alicyclic skeleton is formed at a terminal of the polymer by depletion of the monomer, and polymerization can be restarted from the alicyclic skeleton by further adding monomers sequentially thereto. Thus, the presence or absence of generation of the alicyclic skeleton or the content of the alicyclic skeleton can be adjusted with a time for sequential addition of the monomers, a polymerization temperature, a type and an amount of the catalyst, a combination of the monomer and the catalyst, or the like. In addition, in the anionic polymerization method, an anionic polymerization initiator, a solvent, and, if necessary, a Lewis base can be used.

Examples of an organic lithium compound which can be used as a polymerization initiator for anionic polymerization in the method include methyllithium, ethyllithium, n-butyllithium, sec-butyllithium, tert-butyllithium, and pentyllithium. In addition, examples of a dilithium compound which can be used as the polymerization initiator include naphthalene dilithium and dilithiohexylbenzene.

Examples of the coupling agent include dichloromethane, dibromomethane, dichloroethane, dibromoethane, dibromobenzene, and phenyl benzoate.

The amounts of the polymerization initiator and the coupling agent to be used are appropriately determined depending on a desired weight-average molecular weight of an intended block copolymer and a hydrogenate thereof. Typically, the initiator such as an alkyllithium compound and a dilithium compound is preferably used at a ratio of 0.01 to 0.2 parts by mass with respect to 100 parts by mass of the total of the monomers such as the monomer of the polymer block (A) and the conjugated diene compound used for polymerization, and in a case where the coupling agent is used, the coupling agent is preferably used at a ratio of 0.001 to 0.8 parts by mass with respect to 100 parts by mass of the total of the monomers.

The solvent is not particularly limited as long as it does not adversely affect the anionic polymerization reaction, and examples thereof include aliphatic hydrocarbons such as cyclohexane, methylcyclohexane, n-hexane, and n-pentane; and aromatic hydrocarbons such as benzene, toluene, and xylene. In addition, the polymerization reaction is performed at a temperature of usually 0 to 100° C., and preferably 10 to 70° C. for 0.5 to 50 hours, and preferably 1 to 30 hours.

Furthermore, the content of the alicyclic skeleton (X) or the content of the 3,4-bond and the 1,2-bond in the polymer block (B) can be increased by adding a Lewis base as a cocatalyst during polymerization of the conjugated diene compound.

Examples of the Lewis base which can be used include ethers such as dimethyl ether, diethyl ether, tetrahydrofuran, and 2,2-di(2-tetrahydrofuryl)propane (DTHFP); glycol ethers such as ethylene glycol dimethyl ether, diethylene glycol dimethyl ether, triethylene glycol dimethyl ether, and tetraethylene glycol dimethyl ether; amines such as triethylamine, N,N,N',N'-tetramethylenediamine, N,N,N',N'-tetramethylethylenediamine (TMEDA), and N-methylmorpholine; and metal salts such as sodium or potassium salts of aliphatic alcohols, such as sodium t-butyrate, sodium t-amylate, or sodium isopentylate, or alternatively sodium or potassium salts of alicyclic alcohol, such as dialkylate sodium cyclohexanolate, for example, sodium mentholate. These Lewis bases can be used alone or in combination of two or more kinds thereof.

The amount of the Lewis base to be added is determined by how much the content of the alicyclic skeleton (X) is controlled, and in a case where the polymer block (B) particularly includes a structural unit derived from isoprene and/or butadiene, how much the vinyl bond amount of the isoprene unit and/or the butadiene unit constituting the polymer block (B) is controlled. Therefore, the amount of the Lewis base to be added is not strictly limited, but the Lewis base is used in the range of usually 0.1 to 1,000 mol, and preferably 1 to 100 mol per gram of the lithium atom contained in the alkyllithium compound or the dilithium compound used as the polymerization initiator.

From the viewpoint of increasing the content of the alicyclic skeleton (X), an average feed rate of the conjugated diene compound (hereinafter sometimes referred to as an "average diene feed rate") is preferably 150 kg/h or less, more preferably 110 kg/h or less, and even more preferably 55 kg/h or less, and may be 45 kg/h or less, 30 kg/h or less, or 22 kg/h or less, per mol of the active terminal. From the viewpoint of increasing the productivity, the lower limit is preferably 1 kg/h or more, more preferably 3 kg/h or more, and even more preferably 5 kg/h or more, and may be 7 kg/h or more, 10 kg/h or more, or 15 kg/h or more, per mol of the active terminal.

After performing polymerization according to the above-mentioned method, an active hydrogen compound such as alcohols, carboxylic acids, and water is added to terminate the polymerization reaction, whereby a block copolymer can be obtained.

(Hydrogenate)

In a case where the block copolymer obtained by the production method is formed into a hydrogenate, a hydrogenation reaction is performed in the presence of a hydrogenation catalyst in an inert organic solvent. By the hydrogenation reaction, a carbon-carbon double bond derived from the conjugated diene compound in the polymer block (B) in the block copolymer is hydrogenated, whereby a hydrogenate of the block copolymer of the present invention can be obtained.

The hydrogenation reaction can be carried out at a hydrogen pressure of approximately 0.1 to 20 MPa, preferably 0.5 to 15 MPa, and more preferably 0.5 to 5 MPa and a reaction temperature of approximately 20 to 250° C., preferably 50 to 180° C., and more preferably 70 to 180° C., for a reaction time of usually approximately 0.1 to 100 hours, and preferably 1 to 50 hours.

Examples of the hydrogenation catalyst include Raney nickel; a heterogeneous catalyst in which a metal such as Pt, Pd, Ru, Rh, and Ni is supported on a simple substance such as carbon, alumina, and diatomaceous earth; a Ziegler type catalyst formed of a combination of a transition metal compound with an alkylaluminum compound, an alkyllithium compound, or the like; and a metallocene-based catalyst.

The hydrogenate obtained as above may be acquired by pouring the polymerization reaction liquid into methanol or the like to coagulate the hydrogenate, followed by heating or drying under reduced pressure, or by pouring the polymerization reaction liquid into hot water together with steam to perform so-called steam stripping which is removal of the solvent through azeotropy, followed by heating or drying under reduced pressure.

Whether the block copolymer or the hydrogenate is used in various applications can be specified according to desired performance in various applications. Similarly, how much the hydrogenation rate of the carbon-carbon double bond in the polymer block (B) at the time of forming a hydrogenate should be can be specified according to desired performance in various applications.

For example, as the block copolymer is non-hydrogenated or has a lower hydrogenation rate of a hydrogenate thereof, crosslinking occurs more easily, and therefore, it is possible to form a high-strength foam molded body by performing crosslinking foam molding. Further, as the hydrogenation rate of the hydrogenate is higher, it is possible to obtain a hydrogenate having improved heat resistance and weather resistance.

Therefore, the present invention provides a block copolymer or a hydrogenate thereof, in which the hydrogenation rate of the polymer block (B) is 0% by mole or more (that is, including the case of non-hydrogenation) and less than 50% by mole, and also provides a hydrogenate in which the hydrogenation rate of the polymer block (B) is 50 to 99% by mole.

Furthermore, the hydrogenation rate is a value determined by measuring the content of a carbon-carbon double bond in the structural unit derived from the conjugated diene compound and the alicyclic skeleton (X) in the polymer block (B) by $^1$H-NMR measurement after the hydrogenation, and more specifically, a value measured according to the method described in Examples.

(Bonding Mode of Polymer Block (A) and Polymer Block (B))

As long as the polymer block (A) and the polymer block (B) are bonded in the block copolymer, a bonding mode thereof is not particularly limited, and may be any bonding mode of a linear, branched, or radial bonding mode, or a bonding mode with a combination of two or more thereof. Above all, the bonding mode of the polymer block (A) and the polymer block (B) is preferably linear, and examples thereof include a diblock copolymer represented by A-B in which the polymer block (A) is represented by A and the polymer block (B) is represented by B, a triblock copolymer represented by A-B-A or B-A-B, a tetrablock copolymer represented by A-B-A-B, and a pentablock copolymer represented by A-B-A-B-A or B-A-B-A-B, and an (A-B)nZ-type copolymer (in which Z represents a coupling agent residue and n represents an integer of 3 or more). Among those, the linear triblock copolymer or diblock copolymer is preferred, and the triblock copolymer in the form of A-B-A is preferably used from the viewpoint of flexibility, easiness in production, and the like.

Here, in the present specification, in a case where the same kind of the polymer blocks are bonded linearly via a bifunctional coupling agent or the like, all the bonding polymer blocks are handled as one polymer block. Accordingly, a polymer block which includes the above-mentioned exemplifications and should be strictly expressed as Y-Z-Y (in which Z represents a coupling residue) in nature is represented by Y as a whole, except for a case where it is necessary to be distinguished from the single polymer block Y. In the present specification, such a kind of the polymer block which includes a coupling agent residue is handled as above, and therefore, for example, a block copolymer which includes a coupling agent residue and should be strictly expressed as A-B-Z-B-A (in which Z represents a coupling agent residue) is expressed as A-B-A and is handled as one example of a triblock copolymer.

(Content of Polymer Blocks (A) and (B))

The block copolymer may contain a polymer block constituted with another monomer other than the polymer blocks (A) and (B) as long as the object and the advantageous effects of the present invention are not impaired, but a total content of the polymer block (A) and the polymer block (B) is preferably 90% by mass or more, more preferably 95% by mass or more, and particularly preferably substantially 100% by mass. When the total content is 90% by mass or more, a block copolymer or a hydrogenate thereof, which has excellent vibration damping properties and molding workability and can be suitably used in various applications, can be obtained.

(Weight-Average Molecular Weight)

The weight-average molecular weight (Mw) of the block copolymer and a hydrogenate thereof as determined by gel permeation chromatography in terms of standard polystyrene is preferably 15,000 to 800,000, more preferably 50,000 to 700,000, even more preferably 60,000 to 600,000, even still more preferably 70,000 to 600,000, particularly preferably 90,000 to 500,000, and most preferably 130,000 to 450,000. When the weight-average molecular weight of the block copolymer and a hydrogenate thereof is 15,000 or more, the heat resistance is increased, and when the weight-average molecular weight is 800,000 or less, the moldability is improved.

[tan δ]

(Peak Top Temperature and Intensity of Tan δ)

tan δ (loss tangent) is a ratio of loss modulus/storage modulus at a frequency of 1 Hz in dynamic viscoelasticity measurement, and the peak top temperature and intensity of tan δ make a great contribution to vibration damping properties and the other physical properties. Here, the peak top intensity of tan δ refers to a value of tan δ when the peak of tan δ is maximized. In addition, the peak top temperature of tan δ is a temperature at which the peak of tan δ is maximized.

In the present invention, a block copolymer or a hydrogenate thereof is pressed at a temperature of 230° C. and a pressure of 10 MPa for 3 minutes to manufacture a single-layer sheet having a thickness of 1.0 mm, the single-layer sheet is cut into a disk shape to obtain a test piece, and the peak top intensity and temperature of tan δ were measured using the test piece. The measurement conditions are as follows: a strain of 0.1%, a frequency of 1 Hz, a measurement temperature of −70 to 100° C., and a temperature elevating rate of 3° C./min, in accordance with JIS K7244-10 (2005).

The block copolymer or the hydrogenate thereof of the present invention can have a peak top intensity of tan δ of 1.0 or more as measured above. As a higher value thereof, there may be a value of 1.5 or more, or even 1.9 or more. As the peak top intensity of tan δ is higher, more excellent physical properties such as vibration damping properties at that temperature are exhibited, and when the peak top intensity is 1.0 or more, sufficient vibration damping properties can be obtained in an actual use environment.

Furthermore, in the block copolymer or the hydrogenate thereof of the present invention, the peak top temperature of tan δ is preferably −50° C. or higher, more preferably −40° C. or higher, even more preferably −30° C. or higher, even still more preferably −25° C. or higher, and may be 0° C. or higher. Further, the upper limit of the peak top temperature of the tan δ may be within a range in which the advantageous effects of the present invention are not impaired, and may be 50° C. or lower, 40° C. or lower, or 35° C. or lower. A range of the peak top temperature of tan δ is, for example, preferably −50 to 50° C., more preferably −40 to 40° C., even more preferably −30 to 30° C., and even still more preferably −25 to 25° C. When the peak top temperature of tan δ is −50° C. or higher, sufficient vibration damping properties can be obtained in an actual use environment, and when the peak top temperature of tan δ is 50° C. or lower, it is possible to satisfy a demand for a hardness according to applications and an adhesiveness desired for the case of being used as a bonding adhesive or a pressure-sensitive adhesive.

(Maximum Width of Temperature Region in which Tan δ is 1.0 or More)

Furthermore, the block copolymer or the hydrogenate thereof of the present invention has a series of temperature regions in which tan δ at −70 to 100° C. measured under the measurement conditions is 1.0 or more, and the maximum width of the temperature region is preferably 12° C. or more, more preferably 13° C. or more, even more preferably 15° C. or higher, and even still more preferably 17° C. or higher.

As described above, when the alicyclic skeleton (X) is incorporated into the main chain in the structural unit of the polymer block (B), a higher vinyl bond amount can be obtained, and thus, the glass transition temperature is elevated due to a decrease in the molecular motion, providing gentle glass transition with respect to the temperature change. Thus, the temperature range in which tan δ of the block copolymer or the hydrogenate thereof of the present invention shows 1 or more is broadened, and thus, it becomes possible to exhibit vibration damping properties in a broad temperature range. When the maximum width of the temperature region in which tan δ is 1.0 or more is 12° C. or more, and more preferably 13° C. or more, more excellent vibration damping properties can be obtained in an actual use environment.

<Resin Composition>

Since the block copolymer or the hydrogenate thereof of the present invention has good compatibility with other resin materials, a resin composition containing the block copolymer or the hydrogenate thereof is provided.

Such other resin materials are not particularly limited, examples thereof include resins such as a thermosetting resin and a thermoplastic resin, and from the viewpoint of compatibility and molding workability, the thermoplastic resin (including a thermoplastic elastomer) is preferred.

Examples of the thermoplastic resin include an olefin-based resin, a styrene-based resin, a polyphenylene ether-based resin, a polycarbonate-based resin, a polyamide-based resin, an isobutylene-isoprene copolymer rubber, and a polyurethane-based thermoplastic elastomer, and such thermoplastic resins can be used alone or in combination of two or more kinds thereof.

Examples of the olefin-based resins include polyethylene, polypropylene, polybutene-1, polyhexene-1, poly-3-methyl-butene-1, poly-4-methyl-pentene-1, an ethylene-vinyl acetate copolymer, an ethylene-acrylic acid copolymer, and an olefin-based dynamically crosslinked thermoplastic elastomers (TPV).

Furthermore, examples of the polyethylene include a homopolymer of ethylene, such as a high-density polyethylene, a medium-density polyethylene, and a low-density polyethylene; and an ethylene-based copolymer such as an ethylene/butene-1 copolymer, an ethylene/hexene copolymer, an ethylene/heptene copolymer, an ethylene/octene copolymer, an ethylene/4-methylpentene-1 copolymer, an ethylene/vinyl acetate copolymer, an ethylene/acrylic acid copolymer, an ethylene/acrylic acid ester copolymer, an ethylene/methacrylic acid copolymer, an ethylene/methacrylic acid ester copolymer, an ethylene-propylene-diene copolymer rubber (EPDM), and an ethylene-vinyl acetate copolymer (EVA).

Examples of the polypropylene include a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. Further, a modified polypropylene-based resin prepared by graft copolymerization of such a polypropylene with a modifying agent such as an unsaturated monocarboxylic acid such as acrylic acid, methacrylic acid, and crotonic acid; an unsaturated dicarboxylic acid such as maleic acid, citraconic acid, and itaconic acid; an ester, an amide, or an imide of the unsaturated monocarboxylic acid or the unsaturated dicarboxylic acid; and an unsaturated dicarboxylic anhydride such as maleic anhydride, citraconic anhydride, and itaconic anhydride can also be used.

Examples of the styrene-based resin include polyalkylstyrenes such as polystyrene, polymethylstyrene, polydimethylstyrene, and poly-t-butylstyrene; polyhalogenated styrenes such as polychlorostyrene, polybromostyrene, polyfluorostyrene, and polyfluorostyrene; polyhalogenated substituted alkylstyrenes such as polychloromethylstyrene; polyalkoxystyrenes such as polymethoxystyrene and polyethoxystyrene; polycarboxyalkylstyrenes such as polycarboxymethylstyrene; polyalkyl ether styrenes such as polyvinylbenzylpropyl ether; polyalkylsilylstyrenes such as polytrimethylsilylstyrene; poly(vinylbenzyldimethoxyphosphide), and an acrylonitrile-butadiene-styrene copolymer.

Examples of the polyphenylene ether-based resin include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly(2,6-dichloro-1,4-phenylene)ether, poly(2,6-dibenzyl-1,4-phenylene)ether, and poly(2,5-dimethyl-1,4-phenylene)ether.

The polycarbonate-based resin may be any of an aliphatic polycarbonate and an aromatic polycarbonate. Examples thereof include a polycarbonate-based resin produced from divalent phenols such as bisphenol A, hydroquinone, 2,2-bis(4-hydroxyphenyl)pentane, 2,4-dihydroxydiphenylmethane, bis(2-hydroxyphenyl)methane, and bis(4-hydroxyphenyl)methane with a carbonate precursor such as phosgene, halogen formate, and a carbonate ester.

Examples of the polyamide-based resins include homopolymers such as polycaproamide (nylon 6), polyundecaneamide (nylon 11), polylauryllactam (nylon 12), polyhexamethylene adipamide (nylon 6,6), and polyhexamethylene sebacamide (nylon 6,12); and copolymers such as a caprolactam/lauryllactam copolymer (nylon 6/12), a caprolactam/aminoundecanoic acid copolymer (nylon 6/11), a caprolactam/o-aminononanoic acid copolymer (nylon 6,9), a caprolactam/hexamethylene diammonium adipate copolymer (nylon 6/6,6), and a caprolactam/hexamethylene diammonium adipate/hexamethylene diammonium sebacate copolymer (nylon 6/6,6/6,12).

Examples of the polyurethane-based thermoplastic elastomer include a linear multi-block copolymer of a polyurethane obtained by a reaction of a low molecular polyol with an isocyanate as a hard segment and a polyurethane obtained by a reaction of a high molecular polyol with an isocyanate as a soft segment. The low molecular polyol may be any of an aliphatic diol, an alicyclic diol, and an aromatic diol, examples of the high molecular polyol include a polyester polyol, a polyether polyol, and a polycarbonate polyol, and the isocyanate may be any of an aliphatic diisocyanate, an alicyclic diisocyanate, and an aromatic diisocyanate.

The block copolymer or the hydrogenate thereof is used as a component (I), and at least one selected from an olefin-based resin, a styrene-based resin, a polyphenylene ether-based resin, a polycarbonate-based resin, a polyamide-based resin, an isobutylene-isoprene copolymer rubber, and a polyurethane-based thermoplastic elastomer is as a component (II), in which a content ratio [(I)/(II)] of the component (I) to the component (II) is preferably 1/99 to 99/1, more preferably 3/97 to 80/20, even more preferably 3/97 to 50/50, and particularly preferably 5/95 to 20/80 in terms of a mass ratio. The content ratio of the component (I) and the component (II) may be adjusted from the viewpoint of vibration damping properties, mechanical properties, molding workability, and the like. By increasing the content ratio of the component (I), the vibration damping properties tend to be further improved. In addition, by decreasing the content ratio of the component (II), a decrease in mechanical properties and molding workability is suppressed, and it becomes easy to suppress the component (II) from bleeding out of the resin composition.

The block copolymer or the hydrogenate thereof is not particularly limited in terms of applications, and may be used after being mixed with a polymer other than the component (II) within a range in which the advantageous effects of the present invention are not impaired.

Examples of such a polymer include a polyphenylene sulfide-based resin; a polyacetal-based resin; a polyester-based resin such as polyethylene terephthalate and polybutylene terephthalate; an acrylic resin such as polymethyl acrylate and polymethyl methacrylate; a polyoxymethylene-based resin such as a polyoxymethylene homopolymer and a polyoxymethylene copolymer; an ethylene-propylene copolymer rubber (EPM); a styrene-butadiene copolymer rubber, a styrene-isoprene copolymer rubber, or a hydrogenate thereof or a modified product thereof; a natural rubber; a synthetic isoprene rubber, a liquid polyisoprene rubber and a hydrogenate thereof or modified product; a chloroprene rubber; an acrylic rubber; a butyl rubber; an acrylonitrile-butadiene rubber; an epichlorohydrin rubber; a silicone rubber; a fluorine rubber; chlorosulfonated polyethylene; a urethane rubber; a polyurethane-based elastomer; a polyamide-based elastomer; a styrene-based elastomers; a polyester-based elastomer; and a soft vinyl chloride resin. These polymers can be used alone or in combination of two or more kinds thereof.

The content ratio of the block copolymer or the hydrogenate thereof to the polymer other than the component (II) is preferably the same as the mass ratio [(I)/(II)], and the same applies to a preferred range of the content ratio.

In addition, the block copolymer or the hydrogenate thereof, the component (II), and the polymer other than the component (II) may be mixed. The content ratio of the block copolymer or the hydrogenate thereof to the component (II) and the polymer other than the component (II) is preferably the same content ratio of the mass ratio [(I)/(II)], and the same applies to a preferred range of the content ratio.

(Various Additives)

The resin composition may further contain various additives, in addition to the component (I) and the component (II), within a range in which the advantageous effects of the present invention are not impaired. Examples of such additives include a processing aid, a reinforcing agent, a filler, a plasticizer, an open-cell foaming agent, a heat stabilizer, a light stabilizer, an ultraviolet absorber, an antioxidant, a lubricant, an antistatic agent, an antimicrobial agent, an antifungal agent, a dispersant, a coloring agent, a foaming agent, a foaming aid, a flame retardant, a water repellent, a waterproofing agent, an electric conductivity-imparting agent, a thermal conductivity imparting agent, an electromagnetic wave shielding performance imparting agent, a fluorescent agent, and a crystal nucleating agent. Examples of the filler include an inorganic filler such as talc, clay, mica, calcium silicate, glass, glass hollow beads, glass fibers, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomaceous earth, alumina, titanium oxide, iron oxide, zinc oxide, magnesium oxide, tin oxide, antimony oxide, barium ferrite, strontium ferrite, carbon black, graphite, carbon fibers, active carbon, carbon hollow beads, calcium titanate, lead titanate zirconate, silicon carbide, and mica; an organic filler such as wood powder and starch; and an organic pigment.

Furthermore, the resin composition is not particularly limited in terms of applications, and may be used after being mixed with a hydrogenated resin such as a hydrogenated chromane-indene resin, a hydrogenated rosin-based resin, a hydrogenated terpene resin, and an alicyclic hydrogenated petroleum resin; a tackifying resin such as an aliphatic resin formed of olefin and diolefin polymers; or any other polymer such as a hydrogenated polyisoprene, a hydrogenated polybutadiene, a butyl rubber, polyisobutylene, polybutene, and a polyolefin-based elastomer as an additive, within a range in which the advantageous effects of the present invention are not impaired.

A content of the additive in the resin composition is not particularly limited, and can be appropriately adjusted according to a type of the additive, an application of the resin composition, and the like. In a case where the resin composition contains the additive, the content of the additive may be, for example, 50% by mass or less, 45% by mass or less, 30% by mass or less, or 20% by mass or less, and may also be 0.01% by mass or more, 0.1% by mass or more, 1% by mass or more, or 3% by mass or more, with respect to 100% by mass of the total amount of the resin composition.

(Method of Producing Resin Composition)

A method of preparing the resin composition of the present invention is not particularly limited, and can be prepared using a known means. For example, the resin composition of the present invention can be prepared by mixing the component (I) and the component (II), and, if necessary, various additives using a mixer such as a Henschel mixer, a V blender, a ribbon blender, a tumbler blender, and a conical blender, or alternatively, thereafter, melt-kneading them at 80 to 250° C. using a kneader such as a single-screw extruder, a twin-screw extruder, a kneader, a Banbury mixer, or a roll.

Furthermore, the resin composition can also be prepared by dissolving and mixing the respective components in a solvent in which respective components in [at least the (I) component and the (II) component] are soluble, and removing the solvent.

In addition, in the case of foaming, for example, the resin composition can be obtained by injection-foam molding a resin composition obtained by dry-blending a foaming agent with the resin composition in a mold having a cavity having a desired shape.

<Applications>

The block copolymer or the hydrogenate thereof of the present invention as described above can be used in various applications. At that time, the block copolymer or the hydrogenate thereof may be used alone or may be used as a composition in which various additives exemplified for the resin composition are mixed.

In addition, similarly, the resin composition of the present invention as described above can also be used in various applications.

Since the block copolymer or the hydrogenate thereof of the present invention has excellent vibration damping properties and can also express physical properties such as bonding adhesiveness or pressure-sensitive adhesiveness, it can be used in various applications. Therefore, the present invention also provides a vibration damping material, a film or sheet, a bonding adhesive or pressure-sensitive adhesive, and the like, each using the block copolymer or the hydrogenate thereof, or the resin composition of the present invention.

In addition, a laminate having an X layer containing the block copolymer or the hydrogenate thereof, or the resin composition of the present invention and a Y layer laminated on at least one surface of the X layer can also be provided. As the laminate, for example, a laminated glass is preferred, and with a laminated glass having the X layer as an intermediate film for a laminated glass and the Y layer as a glass, not only excellent vibration damping properties but also excellent acoustic insulating properties can also be expected.

Furthermore, the Y layer may be appropriately selected according to various applications in addition to the glass layer, but examples thereof include a layer containing a thermoplastic resin other than the block copolymer and a hydrogenate thereof of the present invention. Examples of the thermoplastic resin include a polyvinyl acetal resin, an ionomer, an ethylene-vinyl acetate copolymer, a urethane resin, and a polyamide resin.

Other applications include an acoustic absorbing material, an acoustic insulating material, a rubber dam, a shoe sole material, a flooring material, a weather strip, a floor mat, a dash insulators, a roof lining, a door panel, an engine head cover, a door hole seal, and a fender liner, and thus, the block copolymer or the hydrogenate thereof of the present invention is also useful in these applications.

Furthermore, the block copolymer or the hydrogenate thereof, or the resin composition of the present invention can also be used in the field of automobiles, for example, cooling parts such as a thermostat housing, a radiator tank, a radiator hose, a water outlet, a water pump housing, and a rear joint; air intake and exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a quick connector, a canister, a pump module, a fuel pipe, an oil strainer, a lock nut, and a sealant material; structural parts such as a mount bracket, a torque rod, and a cylinder head cover; drive system parts such as a bearing retainer, a gear tensioner, a head lamp actuator gear, an HVAC gear, a slide door roller, and a clutch spherical component; brake system parts such as an air brake tube; on-vehicle electrical components such as an engine compartment wire harness connector, a motor part, a sensor, an ABS bobbin, a combination switch, an on-vehicle switch, and an electronic control unit (ECU) box; and interior and exterior parts such as slide door damper, a door mirror stay, a door mirror bracket, an inner mirror stay, a roof rail, an engine mount bracket, an air cleaner inlet pipe, a door checker, a plastic chain, an emblem, a clip, a breaker cover, a cup holder, an airbag, a fender, a spoiler, a radiator support, a radiator grill, a louver, an air scoop, a hood bulge, a back door, a fuel sender module, a floor mat, an instrument panel, a dashboard, a dash insulator, a rubber dam, a weather strip, and a tire.

In addition, in the field of household appliances, the block copolymer or the hydrogenate thereof, or the resin composition of the present invention can also be used in sealant materials, bonding adhesives, pressure-sensitive adhesives, packings, O rings, belts, acoustic insulating materials, and the like in various electric appliances such as televisions, various recorders such as a blue ray recorder and an HDD recorder, projectors, game machines, digital cameras, home videos, antennas, speakers, electronic dictionaries, IC recorders, FAX machines, copying machines, telephones, door phones, rice cookers, microwave ovens, ovens, refrigerators, dishwashers, dish dryers, IH cooking heaters, hot plates, vacuum cleaners, washing machines, chargers, sewing machines, clothes irons, dryers, electric bicycles, air cleaners, water cleaners, electric toothbrushes, lighting equipment, air conditioners, air conditioner outdoor units, dehumidifiers, and humidifiers.

EXAMPLES

Hereinafter, the present invention will be described in detail with reference to Examples and Comparative Examples, but the present invention is not limited thereto.
<Block Copolymer and Hydrogenate>
Methods of evaluating the physical properties of block copolymers or hydrogenates obtained in Examples and Comparative Examples as described below will be shown.

(1) Content of Polymer Block (A)

A block copolymer before hydrogenation was dissolved in $CDCl_3$ and subjected to $^1$H-NMR measurement [apparatus: "ADVANCE 400 Nano Bay" (manufactured by Bruker Corporation), measurement temperature: 30° C.], and a content of the polymer block (A) was calculated from the ratio of a peak intensity derived from styrene to a peak intensity derived from diene.

(2) Weight-Average Molecular Weight (Mw)

A weight-average molecular weight (Mw) in terms of polystyrene of the block copolymer or a hydrogenate was determined by gel permeation chromatography (GPC) measurement under the following conditions.

(GPC Measurement Apparatus and Measurement Conditions)

Apparatus: GPC apparatus "HLC-8020" (manufactured by Tosoh Corporation)
Separation columns: "TSKgel GMHXL", "G4000HXL", and "G5000HXL", manufactured by Tosoh Corporation, were connected in series.
Eluent: Tetrahydrofuran
Eluent flow rate: 0.7 mL/min
Sample concentration: 5 mg/10 mL
Column temperature: 40° C.
Detector: Differential refractive index (RI) detector
Calibration curve: Created using standard polystyrene (3) Hydrogenation Rate in Polymer Block (B)

The hydrogenation rate was determined by $^1$H-NMR measurement.

Apparatus: Nuclear magnetic resonance apparatus "ADVANCE 400 Nano Bay" (manufactured by Bruker Corporation)
Solvent: $CDCl_3$ (4) Vinyl Bond Amount in Polymer Block (B)

A block copolymer before hydrogenation was dissolved in $CDCl_3$ and subjected to $^1$H-NMR measurement [apparatus: "ADVANCE 400 Nano Bay" (manufactured by Bruker Corporation), measurement temperature: 30° C.]. A vinyl bond amount (a total of the contents of the 3,4-bond unit and the 1,2-bond unit) was calculated from the ratio of the peak area corresponding to the 3,4-bond unit and the 1,2-bond unit in the isoprene structural unit and the 1,2-bond unit in the butadiene structural unit, or to the respective bond units in the case of the structure units derived from a mixture of isoprene and butadiene, with respect to a total peak area of the structural units derived from isoprene and/or butadiene.

(5) Content of Alicyclic Skeleton (X) in Polymer Block (B)

600 mg of a block copolymer before hydrogenation and 40 mg of Cr(acac)$_3$ were dissolved in 4 ml of CDCl$_3$, and subjected to quantitative $^{13}$C-NMR measurement (pulse program: zgig, Inverse gated 1H decoupling method) [apparatus: "ADVANCE 400 Nano Bay" (manufactured by Bruker Corporation), measurement temperature: 30° C.] using a 10-mm NMR tube, and a content of each of the alicyclic skeletons X, X1, and X2 in the polymer block (B) was calculated by the following method.

Furthermore, in Table 3, X, X1, and X2 represent the following alicyclic skeletons.

X: an alicyclic skeleton having a combination of the following substituents (i) to (vi)

X1: an alicyclic skeleton having a combination of the following substituents (i) and (iv)

X2: an alicyclic skeleton having a combination of the following substituents (ii), (iii), (v), and (iv)

(i): R$^1$=hydrogen atom, R$^2$=hydrogen atom, R$^3$=hydrogen atom; (1,2Bd+Bd)

(ii): R$^1$=hydrogen atom, R$^2$=methyl group, R$^3$=hydrogen atom; (1,2Bd+1,2Ip)

(iii): R$^1$=hydrogen atom, R$^2$=hydrogen atom, R$^3$=methyl group; (1,2Bd+3,4Ip)

(iv): R$^1$=methyl group, R$^2$=hydrogen atom, R$^3$=hydrogen atom; (1,2Ip+Bd)

(v): R$^1$=methyl group, R$^2$=methyl group, R$^3$=hydrogen atom; (1,2Ip+1,2Ip)

(vi): R$^1$=methyl group, R$^2$=hydrogen atom, R$^3$=methyl group; (1,2Ip+3,4Ip)

[Calculation Method]

The structures derived from the respective peaks are shown in Table 1-1. In a case where the integrated values of the respective peaks are taken as a to g, the integrated values of the respective structures are as shown in Table 1-2, and the contents of X, X1, and X2 are (a+g−c)/(a+b+c−d+e/2+2f), (g−c)/(a+b+c−d+e/2+2f), and a/(a+b+c−d+e/2+2f).

TABLE 1-1

| Peak (ppm) | Structure | Integrated value |
|---|---|---|
| 108 to 110 | X2 | a |
| 110 to 113 | 3,4Ip + 1,2Ip + X1 | b |
| 113 to 116 | 1,2Bd | c |
| 122 to 127 | 1,4Ip + St | d |
| 127 to 132 | 1,4Bd × 2 + St × 4 | e |
| 132 to 137 | 1,4Ip | f |
| 142 to 145 | 1,2Bd + X1 | g |

TABLE 1-2

| Structure | Integrated value |
|---|---|
| St | d − f |
| 1,4Ip | f |
| 3,4Ip + 1,2Ip | b − (g − c) |
| 1,4Bd | (e − (d − f) × 4)/2 |
| 1,2Bd | c |
| X1 | g − c |
| X2 | a |
| Total | a + b + c − d + e/2 + 2f |

(6) Peak Area Ratio in $^{13}$C-NMR (6-1) Block Copolymer (Non-Hydrogenated)

The block copolymers of Examples 9 to 11 and Comparative Example 1 were subjected to the quantitative $^{13}$C-NMR measurement [apparatus: "ADVANCE 400 Nano Bay" (manufactured by Bruker Corporation), measurement temperature: 30° C., solvent: CDCl$_3$] to calculate a peak area ratio [the peak area at a chemical shift value of 107 to 110 ppm]/[the peak area at a chemical shift value of 110 to 116 ppm].

(6-2) Hydrogenate (after Hydrogenation)

The hydrogenates of Examples 1 to 8 and Comparative Examples 2 and 3 were subjected to the quantitative $^{13}$C-NMR measurement [apparatus: "ADVANCE 400 Nano Bay" (manufactured by Bruker Corporation), measurement temperature: 30° C., solvent: CDCl$_3$] to calculate a peak area ratio [the peak area at a chemical shift value of 50.0 to 52.0 ppm]/[the peak area at a chemical shift value of 43.0 to 45.0 ppm].

In addition, the present measurement results in Examples 4, 5 and 7 in Table 3 were "0", but it means [the peak area at a chemical shift value of 50.0 to 52.0 ppm] was too small to be observed, not meaning that it did not have the alicyclic skeleton (X).

(7) Peak Top Temperature and Peak Top Intensity of tan δ, Maximum Width of Temperature Region in which tan δ Is 1.0 or More, and tan δ Intensities at 20° C. and 30° C.

For the following measurement, a monolayer sheet having a thickness of 1.0 mm was manufactured by pressing a block copolymer or a hydrogenate at a temperature of 230° C. under a pressure of 10 MPa for 3 minutes. The monolayer sheet was cut into a disc shape and taken as a test sheet.

For the measurement, a strain control type dynamic viscoelastometer "ARES-G2" (manufactured by TA Instruments Corporation) having a disc diameter of 8 mm was used as a parallel plate vibrating rheometer, based on JIS K7244-10 (2005).

The test sheet was completely charged into a gap between the two plates and vibrated while applying a frequency of 1 Hz to the test sheet at a strain of 0.1%, and the temperature was elevated from −70° C. to 100° C. at a constant rate of 3° C./min. The temperature of the test sheet and the disc was maintained until a change in the measured values of a shear loss modulus and a shear storage modulus disappeared, a maximum value (peak top intensity) of the peak intensities of tan δ and a temperature (peak top temperature) at which the maximum value was obtained were determined. Further, a maximum width of a temperature region in which tan δ was 1.0 or more, and intensities of tan δ at 20° C. and 30° C. were determined. Higher values thereof indicate that the vibration damping properties are more excellent.

In addition, in Comparative Example 2, since a temperature region in which tan δ was 1.0 or more was not present, the maximum width of the temperature region was described as "0".

Example 1

Production of Hydrogenate (H-TPE-1)

50 kg of cyclohexane as a solvent and 87 g of a cyclohexane solution of sec-butyllithium at a concentration of 10.5% by mass (a substantial amount of sec-butyllithium to be added: 9.1 g) as an anionic polymerization initiator were charged into a pressure-resistant container which had been purged with nitrogen and dried.

After the temperature inside the pressure-resistant container was elevated to 50° C., 1.0 kg of styrene (1) was added thereto to perform polymerization for 1 hour, 63 g of 2,2-di(2-tetrahydrofuryl)propane (DTHFP) as a Lewis base was added thereto at a temperature inside the container of 50° C., a mixed liquid of 8.16 kg of isoprene and 6.48 kg of butadiene was added thereto over 5 hours at an average diene feed rate shown in Table 2 to perform polymerization for additional 2 hours, and 1.0 kg of styrene (2) was further added thereto to perform polymerization for 1 hour, thereby obtaining a reaction liquid including a polystyrene-poly(isoprene/butadiene)-polystyrene triblock copolymer.

A Ziegler type hydrogenation catalyst formed of nickel octylate and trimethyl aluminum was added to the reaction liquid in a hydrogen atmosphere to perform a reaction for 5 hours under the conditions of a hydrogen pressure of 1 MPa and 80° C. The reaction liquid was left to be cooled, depressurized, and then washed with water to remove the catalyst, and the residue was vacuum-dried to obtain a hydrogenate (hereinafter sometimes referred to as H-TPE-1) of the polystyrene-poly(isoprene/butadiene)-polystyrene triblock copolymer.

The respective raw materials and amounts thereof to be used are shown in Table 2. Further, the evaluation results of the physical properties are shown in Table 3.

Examples 2 to 8

Production of Hydrogenates (H-TPE-2) to (H-TPE-8)

Hydrogenates (H-TPE-2) to (H-TPE-8) were produced in the same manner as in Example 1, except that the respective components and amounts thereof to be used, and the reaction conditions were changed as described in Table 2. Further, the evaluation results of the physical properties are shown in Table 3.

Example 9

Production of Block Copolymer (TPE-9)

50 kg of cyclohexane as a solvent and 87 g of a cyclohexane solution of sec-butyllithium at a concentration of 10.5% by mass (a substantial amount of sec-butyllithium to be added: 9.1 g) as an anionic polymerization initiator were charged into a pressure-resistant container which had been purged with nitrogen and dried.

After the temperature inside the pressure-resistant container was elevated to 50° C., 1.0 kg of styrene (1) was added thereto to perform polymerization for 1 hour, the temperature inside the container was elevated to 60° C., then 63 g of 2,2-di(2-tetrahydrofuryl)propane (DTHFP) as a Lewis base was added thereto, a mixed liquid of 8.16 kg of isoprene and 6.48 kg of butadiene was added thereto over 5 hours at an average diene feed rate shown in Table 2 to perform polymerization for additional 2 hours, and 1.0 kg of styrene (2) was further added thereto to perform polymerization for 1 hour, thereby obtaining a reaction liquid including a polystyrene-poly(isoprene/butadiene)-polystyrene triblock copolymer.

200 mL of methanol was added to the obtained mixed reaction liquid to stop the polymerization reaction. The obtained mixed liquid was washed with water and then reprecipitated in a large amount of methanol to obtain a styrene-(isoprene/butadiene)-styrene triblock copolymer (hereinafter sometimes referred to as TPE-9).

The respective raw materials and amounts thereof to be used are shown in Table 2. Further, the evaluation results of the physical properties are shown in Table 3.

Examples 10 and 11

Production of Block Copolymers (TPE-10) and (TPE-11)

Block copolymers TPE-10 and TPE-11 were produced in the same manner as in Example 9, except that the respective components and amounts thereof to be used, and the reaction conditions were changed as described in Table 2. Further, the evaluation results of the physical properties are shown in Table 3.

Comparative Example 1

Production of Block Copolymer (TPE-1')

A block copolymer TPE-1' was produced in the same manner as in Example 9, except that the respective components and amounts thereof to be used, and the reaction conditions were changed as described in Table 2. Further, the evaluation results of the physical properties are shown in Table 3.

Comparative Example 2 and Comparative Example 3

Production of Hydrogenates (H-TPE-2') and (H-TPE-3')

Hydrogenates (H-TPE-2') and (H-TPE-3') were produced in the same manner as in Example 1, except that the respective components and amounts thereof to be used, and the reaction conditions were changed as described in Table 2. Further, the evaluation results of the physical properties are shown in Table 3.

TABLE 2

|  |  |  | Example (hydrogenated) | | | | | | | |
| --- | --- | --- | --- | --- | --- | --- | --- | --- | --- | --- |
|  |  |  | 1 | 2 | 3 | 4 | 5 | 6 | 7 | 8 |
| Block copolymer or hydrogenate | | | H-TPE-1 | H-TPE-2 | H-TPE-3 | H-TPE-4 | H-TPE-5 | H-TPE-6 | H-TPE-7 | H-TPE-8 |
| Amount (kg) to be used | Cyclohexane | | 50 | 50 | 50 | 50 | 50 | 50 | 50 | 50 |
|  | sec-Butyllithium (10.5%-by-mass cyclohexane solution) | | 0.087 | 0.087 | 0.087 | 0.087 | 0.087 | 0.25 | 0.25 | 0.087 |
|  | (A) | Styrene (1) | 1.0 | 1.0 | 1.0 | 0.5 | 1.0 | 3.2 | 3.2 | 1.0 |
|  |  | Styrene (2) | 1.0 | 1.0 | 1.0 | 1.5 | 1.0 | 3.2 | 3.2 | 1.0 |
|  | (B) | Isoprene | 8.16 | 8.16 | 8.16 | 8.16 | 14.64 | 8.24 | 14.98 | 0 |
|  |  | Butadiene | 6.48 | 6.48 | 6.48 | 6.48 | 0 | 6.74 | 0 | 14.64 |
|  | Lewis base | TMEDA | 0 | 0 | 0 | 0 | 0 | 0 | 0 | 0 |
|  |  | Tetrahydrofuran | 0 | 0 | 0 | 0.31 | 0 | 0 | 0 | 0 |
|  |  | DTHFP | 0.063 | 0.063 | 0.032 | 0 | 0.032 | 0.171 | 0.086 | 0.063 |
| Reaction conditions | Diene polymerization temperature (° C.) | | 50 | 40 | 40 | 40 | 40 | 60 | 40 | 60 |
|  | Diene feed time (h) | | 5 | 5 | 1 | 5 | 5 | 5 | 5 | 5 |
|  | Average diene feed rate (kg/h) per mol of active terminal | | 20.5 | 20.5 | 102 | 20.5 | 20.5 | 7.7 | 7.7 | 20.5 |

TABLE 2-continued

|  |  |  | Example (non-hydrogenated) | | | Comparative Example | | |
|---|---|---|---|---|---|---|---|---|
|  |  |  | 9 | 10 | 11 | 1 | 2 | 3 |
| Amount (kg) to be used | Block copolymer or hydrogenate | | TPE-9 | TPE-10 | TPE-11 | TPE-1' | H-TPE-2' | H-TPE-3' |
|  | Cyclohexane | | 50 | 50 | 50 | 50 | 50 | 50 |
|  | sec-Butyllithium (10.5%-by-mass cyclohexane solution) | | 0.087 | 0.087 | 0.101 | 0.101 | 0.186 | 0.087 |
|  | (A) | Styrene (1) | 1.0 | 1.0 | 1.7 | 1.7 | 2.5 | 0.5 |
|  |  | Styrene (2) | 1.0 | 1.0 | 1.7 | 1.7 | 2.5 | 1.5 |
|  | (B) | Isoprene | 8.16 | 14.64 | 13.3 | 13.3 | 6.49 | 8.16 |
|  |  | Butadiene | 6.48 | 0 | 0 | 0 | 5.16 | 6.48 |
|  | Lewis base | TMEDA | 0 | 0 | 0.065 | 0 | 0 | 0 |
|  |  | Tetrahydrofuran | 0 | 0 | 0 | 0.29 | 0 | 0.11 |
|  |  | DTHFP | 0.063 | 0.032 | 0 | 0 | 0 | 0 |
| Reaction conditions | Diene polymerization temperature (° C.) | | 60 | 40 | 40 | 40 | 40 | 40 |
|  | Diene feed time (h) | | 5 | 5 | 5 | 5 | 5 | 2 |
|  | Average diene feed rate (kg/h) per mol of active terminal | | 20.5 | 20.5 | 11.9 | 11.9 | 7.6 | 51.2 |

TABLE 3

|  | Example (hydrogenated) | | | | | | | |
|---|---|---|---|---|---|---|---|---|
|  | 1 | 2 | 3 | 4 | 5 | 6 | 7 | 8 |
| Block copolymer or hydrogenate used | H-TPE-1 | H-TPE-2 | H-TPE-3 | H-TPE-4 | H-TPE-5 | H-TPE-6 | H-TPE-7 | H-TPE-8 |
| Structural unit of polymer block (A) | St | St | St | St | St | St | St | St |
| Components constituting polymer block (B) | Ip/Bd | Ip/Bd | Ip/Bd | Ip/Bd | Ip | Ip/Bd | Ip | Bd |
| Mass ratio of components constituting polymer block (B) | 55/45 | 55/45 | 55/45 | 55/45 | 100 | 55/45 | 100 | 100 |
| Molar ratio of components constituting polymer block (B) | 50/50 | 50/50 | 50/50 | 50/50 | 100 | 50/50 | 100 | 100 |
| Polymer structure | A/B/A | A/B/A | A/B/A | A/B/A | A/B/A | A/B/A | A/B/A | A/B/A |
| Content (% by mass) of polymer block (A) | 12 | 12 | 12 | 12 | 12 | 30 | 30 | 12 |
| Weight-average molecular weight of block copolymer or hydrogenate | 167,000 | 142,000 | 142,400 | 163,000 | 150,000 | 66,000 | 70,000 | 130,000 |
| Hydrogenation rate (% by mole) in polymer block (B) | 95 | 95 | 95 | 91 | 86 | 95 | 88 | 95 |
| Vinyl bond amount (% by mole) in polymer block (B) | 76 | 79 | 81 | 64 | 83 | 73 | 81 | 75 |
| Content (% by mole) of X1 or hydrogenate of X1 in block (B) | 5 | 3.1 | 0.1 | 0.2 | 0 | 7.2 | 0 | 32.4 |
| Content (% by mole) of X2 or hydrogenate of X2 in block (B) | 9.9 | 6.7 | 2.7 | 1.7 | 5.2 | 10.1 | 4.7 | 0 |
| Content (% by mole) of X or hydrogenate of X in block (B) | 14.9 | 9.9 | 2.8 | 1.9 | 5.2 | 17.3 | 4.7 | 32.4 |
| Area ratio in $^{13}$C-NMR at non-hydrogenation [peak area at 107 to 110 ppm]/[peak area at 110 to 116 ppm] | — | — | — | — | — | — | — | — |
| Area ratio in $^{13}$C-NMR after hydrogenation [peak area at 50 to 52 ppm]/[peak area at 43 to 45 ppm] | 0.21 | 0.15 | 0.09 | 0 | 0 | 0.27 | 0 | — |
| Peak top temperature (° C.) of tanδ | 14.9 | 14.7 | 4.7 | −21 | 31.9 | 15.5 | 32.5 | 2.4 |
| Peak top intensity of tanδ | 2.24 | 2.23 | 1.97 | 2.23 | 2.20 | 1.47 | 1.43 | 2.31 |
| Maximum width (° C.) of temperature region with tanδ ≥ 1 | 17.9 | 18.3 | 17.1 | 14.6 | 20.7 | 13.2 | 12.4 | 17.5 |
| tanδ intensity at 20° C. and 1 Hz | 1.70 | 1.72 | 0.77 | 0.09 | 0.29 | 1.10 | 0.22 | 0.65 |
| tanδ intensity at 30° C. and 1 Hz | 0.81 | 0.82 | 0.39 | 0.07 | 2.03 | 0.53 | 1.35 | 0.33 |

|  |  | Example (non-hydrogenated) | | | Comparative Example | | |
|---|---|---|---|---|---|---|---|
|  |  | 9 | 10 | 11 | 1 | 2 | 3 |
| Block copolymer or hydrogenate used | | TPE-9 | TPE-10 | TPE-11 | TPE-1' | H-TPE-2' | H-TPE-3' |
| Structural unit of polymer block (A) | | St | St | St | St | St | St |
| Components constituting polymer block (B) | | Ip/Bd | Ip | Ip | Ip | Ip/Bd | Ip/Bd |
| Mass ratio of components constituting polymer block (B) | | 55/45 | 100 | 100 | 100 | 55/45 | 55/45 |

TABLE 3-continued

| | | | | | | |
|---|---|---|---|---|---|---|
| Molar ratio of components constituting polymer block (B) | 50/50 | 100 | 100 | 100 | 50/50 | 50/50 |
| Polymer structure | A/B/A | A/B/A | A/B/A | A/B/A | A/B/A | A/B/A |
| Content (% by mass) of polymer block (A) | 12 | 12 | 20 | 20 | 20 | 12 |
| Weight-average molecular weight of block copolymer or hydrogenate | 164,000 | 143,000 | 135,300 | 125,000 | 110,000 | 160,000 |
| Hydrogenation rate (% by mole) in polymer block (B) | 0 | 0 | 0 | 0 | 99 | 95 |
| Vinyl bond amount (% by mole) in polymer block (B) | 73 | 83 | 73 | 60 | 7 | 47 |
| Content (% by mole) of X1 or hydrogenate of X1 in block (B) | 7.6 | 0 | 0 | 0 | 0 | 0 |
| Content (% by mole) of X2 or hydrogenate of X2 in block (B) | 10.5 | 5.2 | 1.9 | 0 | 0 | 0 |
| Content (% by mole) of X or hydrogenate of X in block (B) | 18.2 | 5.2 | 1.9 | 0 | 0 | 0 |
| Area ratio in $^{13}$C-NMR at non-hydrogenation [peak area at 107 to 110 ppm]/[peak area at 110 to 116 ppm] | 0.14 | 0.04 | 0.02 | 0 | — | — |
| Area ratio in $^{13}$C-NMR after hydrogenation [peak area at 50 to 52 ppm]/[peak area at 43 to 45 ppm] | — | — | — | — | 0 | 0 |
| Peak top temperature (° C.) of tan δ | 17.4 | 21 | 16.5 | −6.5 | −48.3 | −38.3 |
| Peak top intensity of tan δ | 2.17 | 2.23 | 1.96 | 2.15 | 0.57 | 2.20 |
| Maximum width (° C.) of temperature region with tan δ ≥ 1 | 12.6 | 13.3 | 12.4 | 12.4 | 0 | 11.2 |
| tan δ intensity at 20° C. and 1 Hz | 1.84 | 2.07 | 1.60 | 0.21 | 0.02 | 0.04 |
| tan δ intensity at 30° C. and 1 Hz | 0.63 | 1.04 | 0.60 | 0.14 | 0.03 | 0.05 |

The block copolymers and hydrogenates thereof in Examples exhibit a peak top intensity of tan δ of 1.0 or more, and a peak top temperature of tan δ in a broad temperature region, and therefore, it can be said that the block copolymers and hydrogenates thereof are suitable for a wide range of applications as a vibration damping material. In particular, as compared with Comparative Examples 1 to 3, it can be seen that in Examples 1 to 8, the tan δ intensities at 20° C. and 30° C. are relatively high and the vibration damping properties in the vicinity of room temperature are excellent.

In addition, from Examples, it can be seen that even though any of butadiene alone, isoprene alone, or a mixture of butadiene and isoprene is used as the conjugated diene compound, excellent vibration damping properties can be obtained when an alicyclic skeleton is included in the main chain of the block copolymer or the hydrogenate thereof. In addition, it can be said that in Examples, the maximum width of a series of temperature regions in which tan δ is 1.0 or more is broad, and the vibration damping properties are excellent in a broad temperature region.

On the other hand, the hydrogenated block copolymer of Comparative Example 2 had a peak top intensity of tan δ of less than 1.0, but one of reasons therefor is considered to be that the alicyclic skeleton is not included in the main chain and thus, the vinyl bond amount was relatively low.

<Resin Composition>

Methods of evaluating the physical properties of the resin compositions obtained in Examples and Comparative Examples as described below will be shown.

(Loss Factor)

The resin composition obtained in Examples and Comparative Examples was injection-molded using an injection molding machine ("EC75SX", manufactured by Toshiba Machine Co., Ltd.) to manufacture a sheet having a size of length 200 mm×width 40 mm×thickness 2 mm. The sheet was cut into a sample having a size of length 200 mm×width 10 mm×thickness 2 mm.

Next, the sample was set in a loss factor measuring system (an apparatus for measuring a complex modulus of elasticity, ME3930, manufactured by Bruel & Kjar A/S; electromagnetic vibration exciter MM0002; impedance box MH9123-D). Specifically, one end of the sample was fixed on the top of the apparatus for measuring a complex modulus of elasticity. Further, the sample was tested in a damping test according to a cantilever vibration method in which the other end of the sample was vibrated at a frequency in the range of 0 to 8,000 Hz, and an excitation force and an acceleration signal showing an acceleration wave form at that end were detected. For each sample, measurement was performed at temperatures of 0° C., 20° C., and 40° C.

Based on a speed signal obtained by integrating the excitation force and the acceleration signal thus obtained, the mechanical impedance at the excitation point (a center part of the sample vibrated) was determined. Further, an impedance curve in which the horizontal axis indicates the frequency and the vertical axis indicates the mechanical impedance was created, and from the full width at half maximum of the second peak (2nd mode) as counted from the low frequency side, the loss factor of the sample at each temperature was determined.

In addition, as a value of the loss factor is larger, the vibration damping effect is higher.

[Examples 12 to 22] and [Comparative Examples 4 to 6]

The block copolymers or hydrogenates (H-TPE-1 to H-TPE-8), (TPE-9 to TPE-11), (TPE-1' to H-TPE-3') obtained in Examples and Comparative Examples and the following resins were fed and melt-kneaded according to the formulation shown in Table 4 under the conditions of a cylinder temperature of 200° C. and a screw revolution number of 300 rpm, using a twin-screw extruder ("ZSK26Mc" manufactured by Coperion Corporation) to obtain a resin composition.

With regard to the obtained resin composition, the evaluations of the physical properties were performed, and the results are shown in Table 4.

In addition, differences (Δloss factors) between the loss factors of the resin compositions obtained in Examples and Comparative Examples and the loss factor of the resin alone of Reference Example 1 are shown in Table 4.

<Resin>

Polypropylene-1: "Prime Polypro F327" (MFR [230° C., load 2.16 kg (21 N)]=7 g/10 min, manufactured by Primer Polymer Corporation)

Reference Example 1

With regard to the polypropylenes used in Examples 12 to 22 and Comparative Examples 4 to 6, the loss factors were measured in accordance with the method of evaluating the physical properties. The results are shown in Table 4.

C., and thus, it can be seen that the resin composition of the present invention exhibits good vibration damping properties. In particular, at 20° C. and 40° C., results in which the loss factors of all the Examples were higher than that in the case of polypropylene alone by a Δloss factor of 0.020 or more can be obtained, and thus, it can be said that the resin composition of the present invention tends to have excellent vibration damping properties in the vicinity of 20° C. and 40° C.

Examples 23 to 26, Comparative Example 7, Reference Example 2

In the same manner as in Example 12 but according to the formulation shown in Table 5, resin compositions were produced.

The resultant resin compositions were analyzed to evaluate the physical properties thereof according to the measure-

TABLE 4

| | | Reference Example 1 | Example 12 | Example 13 | Example 14 | Example 15 | Example 16 | Example 17 | Example 18 |
|---|---|---|---|---|---|---|---|---|---|
| Formulation (parts by mass) of resin | Polypropylene-1 | 100 | 90 | 90 | 90 | 90 | 90 | 90 | 90 |
| | H-TPE-1 | | 10 | | | | | | |
| | H-TPE-2 | | | 10 | | | | | |
| | H-TPE-3 | | | | 10 | | | | |
| | H-TPE-4 | | | | | 10 | | | |
| | H-TPE-5 | | | | | | 10 | | |
| | H-TPE-6 | | | | | | | 10 | |
| | H-TPE-7 | | | | | | | | 10 |
| | H-TPE-8 | | | | | | | | |
| | TPE-9 | | | | | | | | |
| | TPE-10 | | | | | | | | |
| | TPE-11 | | | | | | | | |
| | TPE-1' | | | | | | | | |
| | H-TPE-2' | | | | | | | | |
| | H-TPE-3' | | | | | | | | |
| Loss factor (0° C.) | | 0.073 | 0.069 | 0.070 | 0.090 | 0.110 | 0.065 | 0.064 | 0.062 |
| Loss factor (20° C.) | | 0.095 | 0.139 | 0.138 | 0.130 | 0.105 | 0.092 | 0.123 | 0.087 |
| Loss factor (40° C.) | | 0.056 | 0.085 | 0.083 | 0.075 | 0.065 | 0.107 | 0.073 | 0.092 |
| ΔLoss factor (ref. PP, 0° C.) | | — | −0.005 | −0.003 | 0.017 | 0.037 | −0.009 | −0.009 | −0.011 |
| ΔLoss factor (ref. PP, 20° C.) | | — | 0.044 | 0.043 | 0.035 | 0.010 | −0.003 | 0.028 | −0.008 |
| ΔLoss factor (ref. PP, 40° C.) | | — | 0.028 | 0.026 | 0.018 | 0.008 | 0.051 | 0.017 | 0.036 |

| | | Example 19 | Example 20 | Example 21 | Example 22 | Comparative Example 4 | Comparative Example 5 | Comparative Example 6 |
|---|---|---|---|---|---|---|---|---|
| Formulation (parts by mass) of resin | Polypropylene-1 | 90 | 90 | 90 | 90 | 90 | 90 | 90 |
| | H-TPE-1 | | | | | | | |
| | H-TPE-2 | | | | | | | |
| | H-TPE-3 | | | | | | | |
| | H-TPE-4 | | | | | | | |
| | H-TPE-5 | | | | | | | |
| | H-TPE-6 | | | | | | | |
| | H-TPE-7 | | | | | | | |
| | H-TPE-8 | 10 | | | | | | |
| | TPE-9 | | 10 | | | | | |
| | TPE-10 | | | 10 | | | | |
| | TPE-11 | | | | 10 | | | |
| | TPE-1' | | | | | 10 | | |
| | H-TPE-2' | | | | | | 10 | |
| | H-TPE-3' | | | | | | | 10 |
| Loss factor (0° C.) | | 0.092 | 0.073 | 0.065 | 0.068 | 0.088 | 0.074 | 0.078 |
| Loss factor (20° C.) | | 0.135 | 0.130 | 0.096 | 0.124 | 0.107 | 0.083 | 0.088 |
| Loss factor (40° C.) | | 0.072 | 0.076 | 0.095 | 0.065 | 0.064 | 0.052 | 0.057 |
| ΔLoss factor (ref. PP, 0° C.) | | 0.019 | −0.001 | −0.008 | −0.006 | 0.015 | 0.000 | 0.005 |
| ΔLoss factor (ref. PP, 20° C.) | | 0.040 | 0.035 | 0.001 | 0.029 | 0.012 | −0.012 | −0.007 |
| ΔLoss factor (ref. PP, 40° C.) | | 0.016 | 0.020 | 0.039 | 0.009 | 0.007 | −0.004 | 0.001 |

As the loss factors of the resin compositions of Examples 12 to 22, higher values than the loss factors of Comparative Examples 4 to 6 can be obtained at 0° C., 20° C., and 40° ment methods mentioned below. For reference, polypropylene-2 alone was analyzed to show the data thereof as Reference Example 2.

(Resin)
Polypropylene-2: "Hypro-G PP-HP12" (homopolypropylene, MFR [230° C., load 2.16 kg (21 N) catalog value]=12 g/10 min, available from Entec Polymers Corporation)

<Physical Properties of Resin Composition>
(Tan δ (Tension, 10 Hz))
The resin compositions were measured according to JIS K 7244-4(1999). Specifically, the resultant resin composition was injection-molded using an injection molding machine ("EC75SX", available from Toshiba Machine Co., Ltd.) to prepare a sheet having a size of length 50 mm×width 30 mm×thickness 1 mm. The sheet was blanked into a sample having a size of length 30 mm×width 5 mm×thickness 1 mm. Using a dynamic viscoelastometer available from Hitachi High-Technologies Corporation, the sample was analyzed at a measurement temperature of −80° C. to 100° C. and a frequency of 10 Hz to determine the tan δ intensity thereof at 0° C., 20° C. and 40° C.

(Tensile Characteristics)
The resin compositions were measured according to JIS K 7161(2014). Specifically, the resultant resin composition was injection-molded to prepare JIS versatile test pieces A1. Using an all-purpose material tester Model 5566 available from Instron Corporation, the test pieces were analyzed to measure the tensile strength [MPa], the tensile elongation at break [%] and the tensile elastic modulus [MPa] thereof.

(Hardness (Shore A))
The resultant resin composition was formed into test pieces for hardness measurement having a size of 30 mm×25 mm×thickness 5 mm, and according to JIS K 6253(2012), these were tested in a durometer hardness test using a durometer hardness meter type A, GS-619R-G (available from Teclock Co., Ltd.) to measure the Shore A hardness thereof.

(Mfr (230° C., 2.16 kg))
MFR was measured according to JIS K 7210(2014).

Examples 27 to 31, Comparative Example 8

In the same manner as in Example 12 but according to the formulation shown in Table 6, resin compositions (pressure-sensitive or bonding adhesive materials) were produced.

The resultant resin compositions were analyzed according to the measurement methods mentioned below to evaluate the physical properties thereof.

(Tackifying Resin)
"Alcon P-125", available from Arakawa Chemical Industries, Ltd.

(Plasticizer)
"Diana Process Oil PW-32", hydrogenated paraffinic oil, kinematic viscosity at 40° C.: 31 mm$^2$/s, available from Idemitsu Kosan Co., Ltd.

(tan δ (shear, 1 Hz))
The resin compositions were measured according to JIS K 7244-10(2005). Specifically, the resultant resin composition was injection-molded using an injection molding machine ("EC75SX", available from Toshiba Machine Co., Ltd.) to prepare a sheet having a size of length 50 mm×width 30 mm×thickness 1 mm. The sheet was blanked into a disc having a diameter of 8 mm to be a sample. Using a strain control dynamic viscoelastometer "ARES-G2" (available from TA Instruments Corporation), the sample was sandwiched between flat plates having a diameter of 8 mm and tested while vibrated at a strain of 0.1% and a frequency of 1 Hz and heated from −70° C. to 100° C. at 3° C./min to determine the tan δ intensity thereof at 0° C., 20° C. and 40° C.

(40° C. Peel Strength)
A SUS plate having a size of length 75 mm×width 25 mm×thickness 1 mm, a sheet of the resultant resin composition and a polyethylene terephthalate sheet having a thickness of 50 μm were laminated in that order and arranged at

TABLE 5

| | | Reference Example 2 | Example 23 | Example 24 | Example 25 | Example 26 | Comparative Example 8 |
|---|---|---|---|---|---|---|---|
| Resin composition (parts by mass) | Polypropylene-2 | 100 | 90 | 90 | 90 | 90 | 90 |
| | H-TPE-1 | | 10 | | | | |
| | H-TPE-5 | | | 10 | | | |
| | H-TPE-6 | | | | 10 | | |
| | H-TPE-7 | | | | | 10 | |
| | H-TPE-2' | | | | | | 10 |
| tanδ (tension, 10 Hz) | 0° C. | 0.17 | 0.28 | 0.20 | 0.24 | 0.18 | 0.16 |
| | 20° C. | 0.14 | 0.52 | 0.41 | 0.45 | 0.35 | 0.14 |
| | 40° C. | 0.14 | 0.29 | 0.43 | 0.23 | 0.36 | 0.15 |
| Tensile strength [MPa] | | 31.5 | 29.5 | 29.0 | 30.3 | 31.0 | 27.0 |
| Tensile elongation at break [%] | | 99 | 108 | 115 | 104 | 106 | 75 |
| Tensile elastic modulus [MPa] | | 806 | 905 | 935 | 940 | 975 | 767 |
| Hardness (Shore A) | | 94.8 | 95 | 96 | 97 | 98 | 95.8 |
| MFR (230° C., 2.16 kg) | | 11.3 | 10.3 | 10.9 | 9.3 | 9.8 | 8.0 |

As shown in Table 5, the resin compositions of Examples 23 to 26 have a higher tensile elongation at break, a higher tensile elastic modulus and a higher hardness than the resin composition of Comparative Example 7 and the sample of Reference Example 2, and have a higher tensile strength and a larger MFR value than the resin composition of Comparative Example 7. Further, in addition to having excellent mechanical properties, the resin compositions of Examples 23 to 26 have a larger value of tan δ in a temperature range of 0° C. to 40° C. as compared with the resin composition of Comparative Example 7 and the sample of Reference Example 2, and it is known that the resin compositions of these Examples show a high vibration damping performance in a broad temperature range from a low temperature to a relatively high temperature.

the center of a metal spacer having an outer dimension of 200 mm×200 mm, an inner dimension of 150 mm×150 mm and a thickness of 2 mm. The overlaid sheet and the metal spacer were sandwiched between polytetrafluoroethylene sheets, further sandwiched from the outside between metal plates, and compression-molded under a temperature condition of 160° C. and under a load of 20 kgf/cm$^2$ for 3 minutes, using a compression molding machine, to thereby prepare a laminate of PET/the above-obtained resin composition/SUS plate.

Using "Instron 5566" available from Instron Corporation and according to JIS K 6854-2 (1999), the laminate was tested according to a peel strength test under the conditions of a contact angle of 180° and a tensile speed of 100 mm/min and at 40° C. to determine the adhesion strength (peel strength) thereof.

TABLE 6

| | | Example 27 | Example 28 | Example 29 | Example 30 | Example 31 | Comparative Example 8 |
|---|---|---|---|---|---|---|---|
| Resin composition (parts by mass) | H-TPE-1 | 40 | | | | | |
| | H-TPE-5 | | 40 | | | 70 | |
| | H-TPE-6 | | | 40 | | | |
| | H-TPE-7 | | | | 40 | | |
| | H-TPE-2' | | | | | | 40 |
| | Tackifying resin | 40 | 40 | 40 | 40 | 10 | 40 |
| | Plasticizer | 20 | 20 | 20 | 20 | 20 | 20 |
| tanδ (shear, 1 Hz) | 0° C. | 0.80 | 0.30 | 0.50 | 0.20 | 0.50 | 0.04 |
| | 20° C. | 2.50 | 2.00 | 2.10 | 1.70 | 1.80 | 0.02 |
| | 40° C. | 0.70 | 2.00 | 0.40 | 1.80 | 0.80 | 0.03 |
| 40° C. peel strength to SUS, N/25 mm | | 18 | 25 | 17 | 23 | 8 | 6 |

As in Table 6, the resin compositions of Examples 27 to 31 have a higher tan δ at 0° C. to 40° C. than the resin composition of Comparative Example 8, and are excellent in peel strength at 40° C. Accordingly, the resin compositions of Examples 27 to 31 can be favorably used as bonding or pressure-sensitive adhesives capable of expressing vibration damping performance in a wide temperature range.

Examples 32 to 37, Comparative Example 9

In the same manner as in Example 12 but according to the formulation shown in Table 7, resin compositions (oil gels) were produced.

The resultant resin compositions were analyzed according to the measurement methods mentioned below to evaluate the physical properties thereof.
(Plasticizer)
"Diana Process Oil PW-32", hydrogenated paraffinic oil, kinematic viscosity at 40° C.: 31 mm$^2$/s, available from Idemitsu Kosan Co., Ltd.
<Physical Properties of Resin Composition>
(Tan δ (Shear, 1 Hz))

The resin compositions were measured according to the same method as that for "tan δ (shear, 1 Hz)" shown in Table 6.

Examples 38 to 43, Comparative Example 10, Reference Example 3

In the same manner as in Example 12 but according to the formulation shown in Table 8, resin compositions (glass fibers-reinforced polypropylene compositions) were produced. Glass fibers were side-fed at the middle of the extruder.

The resultant resin compositions were analyzed according to the measurement methods mentioned below to evaluate the physical properties thereof. For reference, measured data of a resin composition composed of polypropylene-3, polypropylene-4 and the glass fibers only are shown in the Table as Reference Example 3.
(Resin)
Polypropylene-3: "Prime Polypro J705UG", block polypropylene, available from Prime Polymer Co., Ltd.
Polypropylene-4: "Admer QE840" available from Mitsui Chemicals, Inc.
(Glass Fibers)
"T-480", chopped strands, available from Nippon Electric Glass Co., Ltd.
<Physical Properties of Resin Composition>
(Loss factor)

The resultant resin composition was injection-molded using an injection molding machine ("EC75SX", available from Toshiba Machine Co., Ltd.) to prepare a sheet having a size of length 200 mm×width 40 mm×thickness 2 mm. The sheet was blanked into a size of length 200 mm×width 10

TABLE 7

| | | Example 32 | Example 33 | Example 34 | Example 35 | Example 36 | Example 37 | Comparative Example 9 |
|---|---|---|---|---|---|---|---|---|
| Resin composition (parts by mass) | H-TPE-1 | 90 | | | | | | |
| | H-TPE-5 | | 90 | | | 80 | 70 | |
| | H-TPE-6 | | | 90 | | | | |
| | H-TPE-7 | | | | 90 | | | |
| | H-TPE-2' | | | | | | | 90 |
| | Plasticizer | 10 | 10 | 10 | 10 | 20 | 30 | 10 |
| tanδ (shear, 1 Hz) | 0° C. | 0.30 | 0.10 | 0.20 | 0.10 | 0.50 | 1.10 | 0.04 |
| | 20° C. | 1.60 | 2.20 | 1.30 | 1.80 | 1.80 | 1.40 | 0.03 |
| | 40° C. | 0.40 | 0.70 | 0.30 | 0.50 | 0.40 | 0.20 | 0.04 |

From Table 7, it is known that the resin compositions of Examples 32 to 37 have a higher tan δ at 0° C. to 40° C. including room temperature region than the resin composition of Comparative Example 9, and are excellent in vibration damping performance and shock absorbability. Accordingly, the resin compositions of Examples 32 to 37 are suitable for shoe sole cushion materials and the like.

mm×thickness 2 mm, and a contact chip was stuck to the center part thereof using an adhesive having a main component of α-cyanoacrylate to prepare a sample.

Next, the sample was set in a loss factor measuring system (available from Bruel & Kjar A/S, vibration exciter Model 4809; impedance head 80001 Model).

At the tip of the excitation force detector built in the impedance head, the contact chip stuck to the center part of the sample was fixed. Vibration was given to the center part of the laminate within a frequency range of 0 to 8,000 Hz, and at the point, the excitation force and the acceleration wave form were detected in a damping test according to a center shaking method, in which the excitation force and the acceleration signal to express the acceleration wave form at the center part were detected. For each sample, the measurement test was carried out at a temperature of 0° C., 20° C., 40° C., 60° C., 80° C. and 100° C.

Based on the speed signal determined by integrating the resultant data of the excitation force and the acceleration signal, the mechanical impedance at the excitation point (center part of the sample vibrated) was determined. With that, an impedance curve was drawn on a graph where the horizontal axis indicates the frequency and the vertical axis indicates the mechanical impedance, and from the full width at half maximum of the second peak (2nd mode) counted from the low frequency side, the loss factor of each sample at each temperature was determined.

A sample having a larger value of loss factor has a higher vibration damping effect.

(Tensile Characteristics)

According to the same methods as the measurement methods for tensile characteristics shown in Table 5, the tensile strength [MPa] and the tensile elongation at break [%] were determined.

(Bending Characteristics)

The resultant resin composition was injection-molded using an injection molding machine ("EC75SX", available from Toshiba Machine Co., Ltd.) to prepare a JIS versatile test piece A1, and the center part (80×10×t4 mm) thereof was used here. Based on JIS K 7171(2016) and using a universal tester (5566 Model, available from Instron Corporation), the sample was tested in a bending strength test to measure the bending strength [MPa] and the bending elastic modulus [MPa]

As in Table 8, the resin compositions of Examples 38 to 43 have larger values of tensile strength and bending strength than the resin composition of Comparative Example 10. The resin compositions of Examples 38 to 43 have the same as or a larger tensile elongation at break than the resin composition of Reference Example 3. In addition, the resin compositions of Examples 38 to 43 have a large value of loss factor in a broad temperature range of 40° C. to 100° C. and are known to exhibit a high vibration damping performance in a broad temperature range. In particular, the resin composition of Example 38 or 41 has a larger value of loss factor even at 0° C. and 20° C. than the resin compositions of Comparative Example 10 and Reference Example 3, and is known to exhibit a high vibration damping performance even at low temperatures.

Examples 44 to 47, Comparative Example 11, Reference Example 4

In the same manner as in Example 12 but according to the formulation shown in Table 9, resin compositions were produced.

The resultant resin compositions were analyzed according to the measurement methods mentioned below to evaluate the physical properties thereof. For reference, measured data of a case of polyethylene alone are shown in the Table as Reference Example 4.

(Resin)

Polyethylene: "Hypel PEHD 8" (high-density polyethylene, MFR [190° C., load 2.16 kg (21 N) catalog value]=6.6/10 min, available from Entec Polymers Corporation)

<Physical Properties of Resin Composition>

(Tan δ (Tension, 10 Hz))

This was measured according to the same method as that for "tan δ (tension, 10 Hz)" shown in Table 5.

(Tensile Characteristics)

These were measured according to the same methods as those for the measurement method for tensile characteristics shown in Table 5 to determine the tensile strength [MPa] and the tensile elongation at break [%] thereof.

(Hardness (Shore A))

This was measured according to the same method as that for "hardness (Shore A)" shown in Table 5.

(MFR (190° C., 2.16 kg))

This was measured according to JIS K 7210(2014).

TABLE 8

| | | Reference Example 3 | Example 38 | Example 39 | Example 40 | Example 41 | Example 42 | Example 43 | Comparative Example 10 |
|---|---|---|---|---|---|---|---|---|---|
| Resin composition (parts by mass) | Polypropylene-3 | 68 | 58 | 63 | 58 | 58 | 58 | 58 | 58 |
| | Polypropylene-4 | 2 | 2 | 2 | 2 | 2 | 2 | 2 | 2 |
| | Glass fiber | 30 | 30 | 30 | 30 | 30 | 30 | 30 | 30 |
| | H-TPE-1 | | 10 | | | | | | |
| | H-TPE-5 | | | 5 | 10 | | | | |
| | H-TPE-6 | | | | | 10 | | | |
| | H-TPE-7 | | | | | | 10 | | |
| | TPE-11 | | | | | | | 10 | |
| | H-TPE-2' | | | | | | | | 10 |
| Loss factor (0° C.) | | 0.029 | 0.042 | 0.024 | 0.021 | 0.038 | 0.020 | 0.026 | 0.029 |
| Loss factor (20° C.) | | 0.036 | 0.073 | 0.035 | 0.037 | 0.068 | 0.036 | 0.052 | 0.032 |
| Loss factor (40° C.) | | 0.026 | 0.050 | 0.059 | 0.066 | 0.044 | 0.060 | 0.051 | 0.028 |
| Loss factor (60° C.) | | 0.029 | 0.036 | 0.034 | 0.046 | 0.033 | 0.043 | 0.027 | 0.023 |
| Loss factor (80° C.) | | 0.022 | 0.032 | 0.028 | 0.035 | 0.032 | 0.033 | 0.027 | 0.025 |
| Loss factor (100° C.) | | 0.026 | 0.033 | 0.030 | 0.035 | 0.037 | 0.038 | 0.031 | 0.031 |
| Tensile strength [MPa] | | 74 | 63.5 | 70.3 | 68.8 | 69.6 | 71.2 | 64 | 61.6 |
| Tensile elongation at break [%] | | 2 | 3 | 1.9 | 2.5 | 2.7 | 2.3 | 2.5 | 3.1 |
| Bending strength [MPa] | | 117.8 | 101.5 | 111.6 | 105.9 | 105.5 | 110.3 | 100.1 | 95.5 |
| Bending elastic modulus [MPa] | | 6390 | 5330 | 5888 | 5490 | 5520 | 5780 | 5370 | 5260 |

TABLE 9

|  |  | Reference Example 4 | Example 44 | Example 45 | Example 46 | Example 47 | Comparative Example 11 |
|---|---|---|---|---|---|---|---|
| Resin composition (parts by mass) | Polyethylene | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| tan δ (tension, 10 Hz) | 0° C. | 0.17 | 0.28 | 0.20 | 0.24 | 0.18 | 0.16 |
|  | 20° C. | 0.14 | 0.52 | 0.41 | 0.45 | 0.33 | 0.14 |
|  | 40° C. | 0.14 | 0.29 | 0.43 | 0.23 | 0.35 | 0.15 |
| Tensile strength [MPa] |  | 19.8 | 23 | 23.2 | 24.3 | 24.4 | 22.8 |
| Tensile elongation at break [%] |  | 222 | 870 | 878 | 835 | 824 | 784 |
| Hardness (Shore A) |  | 96 | 96 | 96 | 97 | 97 | 95 |
| MFR (190° C., 2.16 kg) |  | 6.6 | 6.1 | 5.9 | 5.8 | 5.6 | 4.5 |

As in Table 9, the resin compositions of Examples 44 to 47 have a larger tensile strength, a larger tensile elongation at break, and a larger or equal hardness than the resin composition of Comparative Example 11 and the sample of Reference Example 4, and in addition, these have a larger value of MFR than the resin composition of Comparative Example 11. Moreover, the resin compositions of Examples 44 to 47 have a larger value of tan δ in a temperature range of 0° C. to 40° C. than the samples of Comparative Example 11 and Reference Example 4, and are known to exhibit high vibration damping performance in a broad temperature region from a low temperature to a relatively high temperature.

Examples 48 to 52, Comparative Example 12, Reference Example 5

Using a kneader, an ethylene-propylene-diene copolymer (EPDM), an ethylene-vinyl acetate copolymer (EVA), the above-obtained hydrogenate, fillers 1 and 2 and a plasticizer were melt-mixed at a temperature of 120° C. in a ratio according to the formulation shown in Table 10 to prepare a master batch.

Next, a crosslinking agent and a foaming agent were added to the resultant master batch in a ration according to the formulation shown in Table 10, and roll-kneaded at a roll temperature of 110° C. to prepare a resin composition.

Using a mold having a thickness of 10 mm, the resultant resin composition was pressed at 164° C. for 15 minutes to give a molded foam.

The resultant resin compositions (molded foams) were analyzed according to the measurement methods mentioned below to evaluate the physical properties thereof. For reference, measured data of a case not containing the hydrogenate and EVA are shown in the Table as Reference Example 5.

(Resin)
Ethylene-propylene-diene copolymer rubber (EPDM): "Esprene 501A", available from Sumitomo Chemical Co., Ltd.
Ethylene-vinyl acetate copolymer (EVA): "Ultracene 640", available from Tosoh Corporation
(Crosslinking Agent)
Peroxide-based crosslinking agent ("Perkadox 14/40", available from Kayaku Akzo Co., Ltd.) [mixture of bis(t-butyldioxyisopropyl)benzene (40% by mass), calcium carbonate (55.3% by mass), and amorphous silica diluted product (4.7% by mass)]
(Foaming Agent)
Azodicarbonamide-based complex foaming agent ("Cellmike CAP-500", available from Sankyo Chemical Co., Ltd.) (decomposition temperature 155° C., gas flow rate: 160 mL/g)
(Filler)
Filler 1: calcium carbonate
Filler 2: carbon black
(Plasticizer)
"Diana Process Oil PW-380", paraffinic oil, kinematic viscosity at 40° C.: 381.6 mm²/s, available from Idemitsu Kosan Co., Ltd.

<Physical Properties of Resin Composition>
(Tan δ (Tension, 10 Hz))
This was measured according to the same method as that for "tan δ (tension, 10 Hz)" shown in Table 5.

TABLE 10

|  |  | Reference Example 5 | Example 48 | Example 49 | Example 50 | Example 51 | Example 52 | Comparative Example 12 |
|---|---|---|---|---|---|---|---|---|
| Resin composition (parts by mass) | EPDM | 34 | 24 | 24 | 24 | 24 |  | 24 |
|  | EVA |  |  |  |  |  | 24 |  |
|  | H-TPE-1 |  | 30 |  |  |  |  |  |
|  | H-TPE-5 |  |  | 30 |  |  | 30 |  |
|  | H-TPE-6 |  |  |  | 30 |  |  |  |
|  | H-TPE-7 |  |  |  |  | 30 |  |  |
|  | H-TPE-2' |  |  |  |  |  |  | 30 |
|  | Crosslinking agent | 0.7 | 0.7 | 0.7 | 0.7 | 0.7 | 0.7 | 0.7 |
|  | Foaming agent | 5 | 5 | 5 | 5 | 5 | 5 | 5 |
|  | Filler 1 | 20 | 14 | 14 | 14 | 14 | 14 | 14 |
|  | Filler 2 | 20 | 14 | 14 | 14 | 14 | 14 | 14 |
|  | Plasticizer | 20 | 14 | 14 | 14 | 14 | 14 | 14 |

TABLE 10-continued

|  |  | Reference Example 5 | Example 48 | Example 49 | Example 50 | Example 51 | Example 52 | Comparative Example 12 |
|---|---|---|---|---|---|---|---|---|
| tanδ (tension, 10 Hz) | 0° C. | 0.18 | 0.40 | 0.32 | 0.32 | 0.23 | 0.41 | 0.17 |
|  | 20° C. | 0.15 | 1.20 | 0.81 | 1.01 | 0.69 | 0.75 | 0.16 |
|  | 40° C. | 0.15 | 0.50 | 0.85 | 0.41 | 0.72 | 0.77 | 0.15 |

From Table 10, it is known that the resin compositions of Examples 48 to 52 have a larger value of tan δ in a temperature range of 0° C. to 40° C. than the resin composition of Comparative Example 12 and the resin composition of Reference Example 5, and exhibit high vibration damping performance in a broad temperature range from a low temperature to a relatively high temperature.

Examples 53 to 56, Comparative Example 13, Reference Example 6

According to the same method as in Example 12 and according to the formulation shown in Table 11 but changing the cylinder temperature to 230° C., resin compositions were produced.

The resultant resin compositions were analyzed according to the measurement methods mentioned below to evaluate the physical properties thereof. For reference, measured data of a case of TPV alone are shown in the Table as Reference Example 6.
(Resin)
Olefinic, dynamically-crosslinked thermoplastic elastomer (TPV): "Santoprene 201-55", available from Exxon Mobile Corporation
<Physical Properties of Resin Composition>
(Tan δ (Tension, 10 Hz))
This was measured according to the same method as that for "tan δ (tension, 10 Hz)" shown in Table 5.
(Tensile Characteristics)
These were measured according to the same methods as those for the measurement method for tensile characteristics shown in Table 5 to determine the tensile strength [MPa] and the tensile elongation at break [%] thereof.
(Hardness (Shore A))
This was measured according to the same method as that for "hardness (Shore A)" shown in Table 5.
(MFR (230° C., 2.16 kg))
This was measured according to JIS K 7210(2014).

As in Table 11, the resin compositions of Examples 53 to 56 have a larger tensile strength than the resin composition of Comparative Example 13. In addition, the resin compositions of Examples 53 to 56 have a larger tensile elongation at break and a larger value of MFR than the resin composition of Comparative Example 13 and the sample of Reference Example 6. Moreover, the resin compositions of Examples 53 to 56 have a larger value of tan δ in a temperature range of 0° C. to 40° C. than the samples of Comparative Example 13 and Reference Example 6, and are known to exhibit high vibration damping performance in a broad temperature region from a low temperature to a relatively high temperature.

Examples 57 to 60, Comparative Example 14, Reference Example 7

According to the same method as in Example 12 and according to the formulation shown in Table 12 but changing the cylinder temperature to 230° C., resin compositions were produced.

The resultant resin compositions were analyzed according to the measurement methods mentioned below to evaluate the physical properties thereof. For reference, measured data of a case of ABS alone are shown in the Table as Reference Example 7.
(Resin)
Acrylonitrile-butadiene-styrene copolymer (ABS): "Techno ABS 11N", available from Techno UMG Corporation
<Physical Properties of Resin Composition>
(Loss Factor)
This was measured according to the same measurement method for loss factor shown in Table 8, at a temperature of 0° C., 20° C. and 40° C.

TABLE 11

|  |  | Reference Example 6 | Example 53 | Example 54 | Example 55 | Example 56 | Comparative Example 13 |
|---|---|---|---|---|---|---|---|
| Resin composition (parts by mass) | TPV | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| tanδ (tension, 10 Hz) | 0° C. | 0.15 | 0.25 | 0.18 | 0.22 | 0.18 | 0.14 |
|  | 20° C. | 0.13 | 0.46 | 0.34 | 0.41 | 0.30 | 0.14 |
|  | 40° C. | 0.13 | 0.23 | 0.37 | 0.19 | 0.31 | 0.13 |
| Tensile strength [MPa] |  | 3.4 | 3.4 | 3.4 | 3.5 | 3.6 | 3.2 |
| Tensile elongation at break [%] |  | 202 | 385 | 391 | 358 | 346 | 262 |
| Hardness (Shore A) |  | 60 | 59 | 58 | 60 | 61 | 59.8 |
| MFR (190° C., 2.16 kg) |  | 3.1 | 7.6 | 8.3 | 6.4 | 6.8 | 2 |

TABLE 12

|  |  | Reference Example 7 | Example 57 | Example 58 | Example 59 | Example 60 | Comparative Example 14 |
|---|---|---|---|---|---|---|---|
| Resin composition (parts by mass) | ABS | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  | 0.006 | 0.023 | 0.013 | 0.019 | 0.011 | 0.008 |
| Loss factor (20° C.) |  | 0.007 | 0.043 | 0.020 | 0.038 | 0.018 | 0.007 |
| Loss factor (40° C.) |  | 0.010 | 0.032 | 0.050 | 0.027 | 0.045 | 0.011 |

As in Table 12, the resin compositions of Examples 57 to 60 have a larger value of loss factor in a temperature range of 0° C. to 40° C. than the resin composition of Comparative Example 14 and the sample of Reference Example 7, and are known to have high vibration damping performance in a broad temperature range of from a low temperature to a relatively high temperature.

Examples 61 to 64, Comparative Example 15, Reference Example 8

According to the same method as in Example 12 and according to the formulation shown in Table 13 but changing the cylinder temperature to 250° C., resin compositions were produced.

The resultant resin compositions were analyzed according to the measurement methods mentioned below to evaluate the physical properties thereof. For reference, measured data of a case of nylon 6 alone are shown in the Table as Reference Example 8.

(Resin)
Nylon 6: "UBE Nylon 1013B", available from Ube Kosan Co., Ltd.
<Physical Properties of Resin Composition>
(Loss Factor)
This was measured according to the same measurement method for loss factor shown in Table 8, at a temperature of 0° C., 20° C. and 40° C.

As in Table 13, the resin compositions of Examples 61 to 64 have a larger value of loss factor in a temperature range of 0° C. to 40° C. than the resin composition of Comparative Example 15 and the sample of Reference Example 8, and are known to have high vibration damping performance in a broad temperature range of from a low temperature to a relatively high temperature.

Examples 65 to 68, Comparative Example 16, Reference Example 9

According to the same method as in Example 12 and according to the formulation shown in Table 14 but changing the cylinder temperature to 270° C., resin compositions were produced.

The resultant resin compositions were analyzed according to the measurement methods mentioned below to evaluate the physical properties thereof. For reference, measured data of a case of PBT alone are shown in the Table as Reference Example 9.

(Resin)
Polybutylene terephthalate (PBT): "Toraycon 1401X31", available from Toray Industries, Inc.
<Physical Properties of Resin Composition>
(Loss Factor)
This was measured according to the same measurement method for loss factor shown in Table 8, at a temperature of 0° C., 20° C. and 40° C.

TABLE 13

|  |  | Reference Example 8 | Example 61 | Example 62 | Example 63 | Example 64 | Comparative Example 15 |
|---|---|---|---|---|---|---|---|
| Resin composition (parts by mass) | Nylon 6 | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  | 0.02 | 0.05 | 0.03 | 0.04 | 0.03 | 0.02 |
| Loss factor (20° C.) |  | 0.03 | 0.10 | 0.06 | 0.08 | 0.05 | 0.03 |
| Loss factor (40° C.) |  | 0.09 | 0.10 | 0.11 | 0.10 | 0.11 | 0.07 |

TABLE 14

|  |  | Reference Example 9 | Example 65 | Example 66 | Example 67 | Example 68 | Comparative Example 16 |
|---|---|---|---|---|---|---|---|
| Resin composition (parts by mass) | PBT | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  |  | 0.008 | 0.021 | 0.008 | 0.018 | 0.008 | 0.009 |
| Loss factor (20° C.) |  |  | 0.008 | 0.053 | 0.015 | 0.044 | 0.012 | 0.007 |
| Loss factor (40° C.) |  |  | 0.020 | 0.033 | 0.060 | 0.029 | 0.049 | 0.017 |

As in Table 14, the resin compositions of Examples 65 to 68 have a larger value of loss factor in a temperature range of 20° C. to 40° C. than the resin composition of Comparative Example 16 and the sample of Reference Example 9, and are known to have high vibration damping performance in a temperature range suitable for practical use. In particular, the resin compositions of Examples 65 and 67 have a larger value of loss factor even at 0° C. than the resin composition of Comparative Example 16 and the sample of Reference Example 9, and is known to have high vibration damping performance even at a low temperature.

Examples 69 to 72, Comparative Example 17, Reference Example 10

According to the same method as in Example 12 and according to the formulation shown in Table 15 but changing the cylinder temperature to 280° C., resin compositions were produced.

The resultant resin compositions were analyzed according to the measurement methods mentioned below to evaluate the physical properties thereof. For reference, measured data of a case of polycarbonate alone are shown in the Table as Reference Example 10.

(Resin)
Polycarbonate: "Iupilon S-3000", available from Mitsubishi Engineering Plastics Corporation
<Physical Properties of Resin Composition>
(Loss Factor)

This was measured according to the same measurement method for loss factor shown in Table 8, at a temperature of 0° C., 20° C. and 40° C.

As in Table 15, the resin compositions of Examples 69 to 72 have the same value or a larger value of loss factor in a temperature range of 0° C. to 40° C. as or than the resin composition of Comparative Example 17 and the sample of Reference Example 10, and are known to have high vibration damping performance in a broad temperature range of from a low temperature to a relatively high temperature.

Examples 73 to 76, Comparative Example 18, Reference Example 11

According to the same method as in Example 12 and according to the formulation shown in Table 16, resin compositions were produced.

The resultant resin compositions were analyzed according to the measurement methods mentioned below to evaluate the physical properties thereof. For reference, measured data of a case of POM alone are shown in the Table as Reference Example 11.

(Resin)
Polyacetal (POM): "Duracon M90-44", available from Polyplastics Co., Ltd.
<Physical Properties of Resin Composition>
(Loss Factor)

This was measured according to the same measurement method for loss factor shown in Table 8.

TABLE 15

|  |  | Reference Example 10 | Example 69 | Example 70 | Example 71 | Example 72 | Comparative Example 17 |
|---|---|---|---|---|---|---|---|
| Resin composition (parts by mass) | Polycarbonate | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  |  | 0.013 | 0.024 | 0.013 | 0.020 | 0.013 | 0.013 |
| Loss factor (20° C.) |  |  | 0.008 | 0.043 | 0.024 | 0.038 | 0.021 | 0.008 |
| Loss factor (40° C.) |  |  | 0.006 | 0.024 | 0.037 | 0.019 | 0.031 | 0.006 |

TABLE 16

|  |  | Reference Example 11 | Example 73 | Example 74 | Example 75 | Example 76 | Comparative Example 18 |
|---|---|---|---|---|---|---|---|
| Resin composition (parts by mass) | POM | 100 | 90 | 90 | 90 | 90 | 90 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  | 0.017 | 0.025 | 0.017 | 0.023 | 0.017 | 0.019 |
| Loss factor (20° C.) |  | 0.018 | 0.086 | 0.022 | 0.075 | 0.020 | 0.019 |
| Loss factor (40° C.) |  | 0.019 | 0.024 | 0.101 | 0.019 | 0.087 | 0.021 |
| Loss factor (60° C.) |  | 0.023 | 0.025 | 0.029 | 0.025 | 0.026 | 0.021 |
| Loss factor (80° C.) |  | 0.021 | 0.024 | 0.025 | 0.029 | 0.028 | 0.022 |
| Loss factor (100° C.) |  | 0.025 | 0.026 | 0.027 | 0.039 | 0.041 | 0.026 |

As in Table 16, the resin compositions of Examples 73 to 76 have the same value or a larger value of loss factor in a temperature range of 20° C. to 100° C. as or than the resin composition of Comparative Example 18 and the sample of Reference Example 11, and are known to have high vibration damping performance in a broad temperature range. In particular, the resin compositions of Examples 73 and 75 have a larger value of loss factor even at 0° C. than the resin composition of Comparative Example 18 and the sample of Reference Example 11, and are known to have high vibration damping performance even at a low temperature.

Examples 77 to 80, Comparative Example 19, Reference Example 12

According to the same method as in Example 12 and according to the formulation shown in Table 17 but changing the cylinder temperature to 250° C., resin compositions were produced.

The resultant resin compositions were analyzed according to the measurement methods mentioned below to evaluate the physical properties thereof. For reference, measured data of a case of PPE and polystyrene alone are shown in the Table as Reference Example 12.
(Resin)
Polyphenylene ether (PPE): "NORYL 640", available from SABIC Innovation Plastics Corporation
Polystyrene: "Toyostyrol G210C", available from Toyo Styrene Co., Ltd.
<Physical Properties of Resin Composition>
(Loss factor)
This was measured according to the same method for "loss factor" shown in Table 8.

As in Table 17, the resin compositions of Examples 77 to 80 have a larger value of loss factor in a temperature range of 20° C. to 100° C. than the resin composition of Comparative Example 19 and the sample of Reference Example 12, and are known to have high vibration damping performance in a broad temperature range. In particular, the resin compositions of Examples 77 and 79 have a larger value of loss factor even at 0° C. than the resin composition of Comparative Example 19 and the sample of Reference Example 12, and are known to have high vibration damping performance even at a low temperature.

Examples 81 to 84, Comparative Example 20, Reference Example 13

According to the same method as in Example 12 and according to the formulation shown in Table 18 but changing the cylinder temperature to 270° C., resin compositions were produced.

The resultant resin compositions were analyzed according to the measurement methods mentioned below to evaluate the physical properties thereof. For reference, measured data of a case of nylon 6, PPE and maleic anhydride alone are shown in the Table as Reference Example 13.
(Resin)
Nylon 6: "UBE Nylon 1013B", available from Ube Kosan Co., Ltd.
Polyphenylene ether (PPE): "NORYL 640", available from SABIC Innovation Plastics Corporation
<Physical Properties of Resin Composition>
(Loss Factor)
This was measured at a temperature of 0° C., 20° C. and 40° C. according to the same method for loss factor shown in Table 8.

TABLE 17

|  |  | Reference Example 12 | Example 77 | Example 78 | Example 79 | Example 80 | Comparative Example 19 |
|---|---|---|---|---|---|---|---|
| Resin composition (parts by mass) | PPE | 50 | 45 | 45 | 45 | 45 | 45 |
|  | Polystyrene | 50 | 45 | 45 | 45 | 45 | 45 |
|  | H-TPE-1 |  | 10 |  |  |  |  |
|  | H-TPE-5 |  |  | 10 |  |  |  |
|  | H-TPE-6 |  |  |  | 10 |  |  |
|  | H-TPE-7 |  |  |  |  | 10 |  |
|  | H-TPE-2' |  |  |  |  |  | 10 |
| Loss factor (0° C.) |  | 0.006 | 0.030 | 0.008 | 0.025 | 0.008 | 0.019 |
| Loss factor (20° C.) |  | 0.007 | 0.062 | 0.025 | 0.051 | 0.022 | 0.013 |
| Loss factor (40° C.) |  | 0.010 | 0.031 | 0.044 | 0.025 | 0.041 | 0.013 |
| Loss factor (60° C.) |  | 0.013 | 0.025 | 0.056 | 0.018 | 0.051 | 0.016 |
| Loss factor (80° C.) |  | 0.017 | 0.025 | 0.050 | 0.048 | 0.046 | 0.020 |
| Loss factor (100° C.) |  | 0.021 | 0.030 | 0.042 | 0.041 | 0.045 | 0.025 |

TABLE 18

| | | Reference Example 13 | Example 81 | Example 82 | Example 83 | Example 84 | Comparative Example 20 |
|---|---|---|---|---|---|---|---|
| Resin composition (parts by mass) | Nylon 6 | 50 | 45 | 45 | 45 | 45 | 45 |
| | PPE | 50 | 45 | 45 | 45 | 45 | 45 |
| | H-TPE-1 | | 10 | | | | |
| | H-TPE-5 | | | 10 | | | |
| | H-TPE-6 | | | | 10 | | |
| | H-TPE-7 | | | | | 10 | |
| | H-TPE-2' | | | | | | 10 |
| | Maleic anhydride | 0.5 | 0.5 | 0.5 | 0.5 | 0.5 | 0.5 |
| Loss factor (0° C.) | | 0.010 | 0.040 | 0.010 | 0.029 | 0.010 | 0.013 |
| Loss factor (20° C.) | | 0.010 | 0.058 | 0.030 | 0.051 | 0.023 | 0.011 |
| Loss factor (40° C.) | | 0.013 | 0.043 | 0.051 | 0.023 | 0.043 | 0.012 |

As in Table 18, the resin compositions of Examples 81 to 84 have a larger value of loss factor in a temperature range of 20° C. to 40° C. than the resin composition of Comparative Example 20 and the resin composition of Reference Example 13, and are known to have high vibration damping performance in a temperature range suitable for practical use. In particular, the resin compositions of Examples 81 and 83 have a larger value of loss factor even at 0° C. than those of Comparative Example 20 and Reference Example 13, and are known to have high vibration damping performance even at a low temperature.

Examples 85 to 89, Comparative Example 21, Reference Example 14

According to the same method as in Example 12 and according to the formulation shown in Table 19 but changing the cylinder temperature to 300° C., resin compositions were produced.

The resultant resin compositions were analyzed according to the measurement methods mentioned below to evaluate the physical properties thereof. For reference, measured data of a case of PPS alone are shown in the Table as Reference Example 14.
(Resin)
Polyphenylene sulfide (PPS): "Toraylina A900", available from Toray Industries, Inc.
<Physical Properties of Resin Composition>
(Loss Factor)
This was measured at a temperature of 0° C., 20° C., 40° C. and 60° C. according to the same method for loss factor shown in Table 8.

Example 21 and the sample of Reference Example 14, and are known to have high vibration damping performance in a broad temperature range of from a low temperature to a high temperature.

INDUSTRIAL APPLICABILITY

The block copolymer, the hydrogenate thereof, and the resin composition of the present invention are useful as a vibration damping material, an acoustic insulating material, a shoe sole material, a flooring material, a gear, a gear box, a vibration damping coating material, a bonding adhesive, a pressure-sensitive adhesive, or the like. Further, they are also useful as automobile parts, for example, as cooling parts such as a thermostat housing, a radiator tank, a radiator hose, a water outlet, a water pump housing, and a rear joint; air intake and exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a quick connector, a canister, a pump module, a fuel pipe, an oil strainer, a lock nut, and a sealant material; structural parts such as a mount bracket, a torque rod, and a cylinder head cover; drive system parts such as a bearing retainer, a gear tensioner, a head lamp actuator gear, an HVAC gear, a slide door roller, and clutch spherical components; brake system parts such as an air brake tube; on-vehicle electrical components such as an engine compartment wire harness connector, a motor part, a sensor, an ABS bobbin, a combination switch, an on-vehicle switch, and an electronic control unit (ECU) box; and interior and exterior parts such as slide door damper, a door mirror stay,

TABLE 19

| | | Reference Example 14 | Example 85 | Example 86 | Example 87 | Example 88 | Example 89 | Comparative Example 21 |
|---|---|---|---|---|---|---|---|---|
| Resin composition | PPS | 100 | 95 | 90 | 90 | 90 | 90 | 90 |
| | H-TPE-1 | | | 10 | | | | |
| | H-TPE-5 | | 5 | | 10 | | | |
| | H-TPE-6 | | | | | 10 | | |
| | H-TPE-7 | | | | | | 10 | |
| | H-TPE-2' | | | | | | | 10 |
| Loss factor (0° C.) | | 0.008 | 0.011 | 0.025 | 0.013 | 0.021 | 0.012 | 0.008 |
| Loss factor (20° C.) | | 0.008 | 0.015 | 0.035 | 0.024 | 0.031 | 0.019 | 0.007 |
| Loss factor (40° C.) | | 0.006 | 0.024 | 0.030 | 0.035 | 0.024 | 0.032 | 0.006 |
| Loss factor (60° C.) | | 0.007 | 0.018 | 0.027 | 0.030 | 0.022 | 0.024 | 0.007 |

As in Table 19, the resin compositions of Examples 85 to 89 have a larger value of loss factor in a temperature range of 0° C. to 60° C. than the resin composition of Comparative a door mirror bracket, an inner mirror stay, a roof rail, an engine mount bracket, an air cleaner inlet pipe, a door checker, a plastic chain, an emblem, a clip, a breaker cover, a cup holder, an airbag, a fender, a spoiler, a radiator support, a radiator grill, a louver, an air scoop, a hood bulge, a back door, a fuel sender module, a floor mat, an instrument panel, a dash board, a dash insulator, a rubber dam, a weather strip and a tire.

In addition, in the field of household appliances, the block copolymer, the hydrogenate thereof, and the resin composition are also useful as bonding adhesives or pressure-sensitive adhesives, sealant materials, packings, O rings, belts, acoustic insulating materials, and the like in various electric appliances such as televisions, various recorders such as a blue ray recorder and an HDD recorder, projectors, game machines, digital cameras, home videos, antennas, speakers, electronic dictionaries, IC recorders, FAX machines, copying machines, telephones, door phones, rice cookers, microwave ovens, ovens, refrigerators, dishwashers, dish dryers, IH cooking heaters, hot plates, vacuum cleaners, washing machines, chargers, sewing machines, clothes irons, dryers, electric bicycles, air cleaners, water cleaners, electric toothbrushes, lighting equipment, air conditioners, air conditioner outdoor units, dehumidifiers, and humidifiers.

The invention claimed is:

1. A block copolymer or a hydrogenate thereof, comptising a polymer block (A) and a polymer block (B), wherein the polymer block (B) has a structural unit derived from a conjugated diene compound, the structural unit including one or more kinds of alicyclic skeletons (X) represented by the following formula (X) in the main chain:

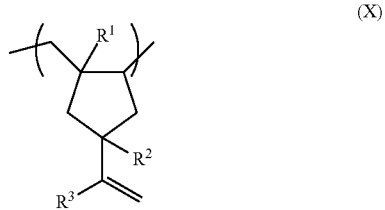

wherein $R^1$ to $R^3$ each independently represent a hydrogen atom or a hydrocarbon group having 1 to 11 carbon atoms, and a plurality of each of $R^1$ to $R^3$ may be the same as or different from each other,
wherein the polymer block (A) contains a structural unit derived from an aromatic vinyl compound in the amount of more than 70% b mole.

2. The block copolymer or the hydrogenate thereof according to claim 1, wherein an alicyclic skeleton (X') in which at least one of $R^1$ to $R^3$ is a hydrocarbon group having 1 to 11 carbon atoms is included as the alicyclic skeleton (X).

3. The block copolymer or the hydrogenate thereof according to claim 2, wherein the hydrocarbon group in the alicyclic skeleton (X') is a methyl group.

4. The block copolymer or the hydrogenate thereof according to claim 1, wherein $R^1$ to $R^3$ are simultaneously hydrogen atoms.

5. The block copolymer or the hydrogenate thereof according to claim 1, wherein the polymer block (B) contains the alicyclic skeleton (X) in the amount of 1% by mole or more.

6. The block copolymer or the hydrogenate thereof according to claim 2, wherein the polymer block (B) contains the alicyclic skeleton (X') in the amount of 1% by mole or more.

7. The block copolymer or the hydrogenate thereof according to claim 1, wherein a hydrogenation rate of the polymer block (B) is 0% by mole or more and less than 50% by mole.

8. The hydrogenate according to claim 1, wherein the hydrogenation rate of the polymer block (B) is 50 to 99% by mole.

9. The block copolymer or the hydrogenate thereof according to claim 1, wherein a vinyl bond amount in the polymer block (B) is 55 to 95% by mole.

10. The block copolymer or the hydrogenate thereof according to claim 1, wherein a series of temperature regions in which tanδ, as measured under the conditions of a strain of 0.1%, a frequency of 1 Hz, a measurement temperature of −70 to 100° C., and a temperature elevating rate of 3° C/min in accordance with JIS K7244-10 (2005), is 1.0 or more is present, and the maximum width of the temperature region is 13° C. or more.

11. The block copolymer or the hydrogenate thereof according to claim 1, wherein a content of the polymer block (A) in the block copolymer is 50% by mass or less.

12. The block copolymer or the hydrogenate thereof according to claim 11, wherein the content of the polymer block (A) in the block copolymer is 16% by mass or less.

13. A resin composition comprising the block copolymer or the hydrogenate thereof according to claim 1.

14. A resin composition comprising a component (I) which is the block copolymer or the hydrogenate thereof according to claim 1 and a component (II) which is at least one selected from an olefin-based resin, a styrene-based resin, a polyphenylene ether-based resin, a polycarbonate-based resin, a polyamide-based resin, an isobutylene-isoprene copolymer rubber, and a polyurethane-based thermoplastic elastomer, in which a content ratio [(I)(II)] of the component (I) to the component (II) is 1/99 to 99/1 in terms of a mass ratio.

15. A film or sheet formed by molding the block copolymer or the hydrogenate thereof according to claim 1.

16. A vibration damping material comprising the block copolymer or the hydrogenate thereof according to claim 1.

17. A bonding adhesive or a pressure-sensitive adhesive, comprising the block copolymer or the hydrogenate thereof according to claim 1.

18. A laminate comprising an X layer containing the block copolymer or the hydrogenate thereof according to claim 1, and a Y layer laminated on at least one surface of the X layer.

* * * * *